(12) United States Patent
Thomas et al.

(10) Patent No.: US 11,153,231 B2
(45) Date of Patent: Oct. 19, 2021

(54) APPARATUS AND METHOD FOR PROCESSING FLUSH REQUESTS WITHIN A PACKET NETWORK

(71) Applicant: Arm Limited, Cambridge (GB)

(72) Inventors: Tessil Thomas, Cambridge (GB); Andrew Joseph Rushing, Austin, TX (US)

(73) Assignee: Arm Limited, Cambridge (GB)

( * ) Notice: Subject to any disclaimer, the term of this patent is extended or adjusted under 35 U.S.C. 154(b) by 165 days.

(21) Appl. No.: 16/516,698

(22) Filed: Jul. 19, 2019

(65) Prior Publication Data

US 2021/0021544 A1    Jan. 21, 2021

(51) Int. Cl.
*H04L 12/861* (2013.01)
*H04L 12/741* (2013.01)
(Continued)

(52) U.S. Cl.
CPC .............. *H04L 49/90* (2013.01); *H04L 45/74* (2013.01); *G06F 3/0659* (2013.01); *G06F 12/0804* (2013.01)

(58) Field of Classification Search
CPC .... G06F 9/3836; G06F 9/3859; G06F 9/3861; G06F 9/3867; G06F 11/1471;
(Continued)

(56) References Cited

U.S. PATENT DOCUMENTS

| 7,685,371 B1* | 3/2010 | Duncan ............... G06F 13/1642 |
| | | 711/135 |
| 2016/0378709 A1* | 12/2016 | Menachem ......... G06F 11/3027 |
| | | 710/308 |

(Continued)

FOREIGN PATENT DOCUMENTS

EP    3214550    9/2017

OTHER PUBLICATIONS

International Search Report and Written Opinion of the International Searching Authority for PCT/GB2020/051214 dated Jul. 22, 2020, 17 pages.

*Primary Examiner* — Marsha D Banks Harold
*Assistant Examiner* — Dharmesh J Patel
(74) *Attorney, Agent, or Firm* — Nixon & Vanderhye P.C.

(57) ABSTRACT

An apparatus and method are provided for processing flush requests within a packet network. The apparatus comprises a requester device within the packet network arranged to receive a flush request generated by a remote agent requesting that one or more data items be flushed to a point of persistence. The requester device translates the flush request into a packet-based flush command conforming to a packet protocol of the packet network. A completer device within the packet network that is coupled to a persistence domain incorporating the point of persistence is arranged to detect receipt of the packet-based flush command, and then trigger a flush operation within the persistence domain to flush the one or more data items to the point of persistence. This provides a fast, hardware-based, mechanism for performing a flush operation within a persistence domain without needing to trigger software in the persistence domain to handle the flush to the point of persistence.

27 Claims, 15 Drawing Sheets

(51) Int. Cl.
*G06F 12/0804* (2016.01)
*G06F 3/06* (2006.01)

(58) Field of Classification Search
CPC .. G06F 12/0804; G06F 13/385; G06F 13/405; G06F 13/1642; G06F 13/1668; G06F 13/4022; G06F 13/4247; G06F 13/4059; H04L 29/06333; H04L 29/12037; H04L 29/12103; H04L 29/12207; H04L 29/12688; H04L 29/12783; H04L 45/00; H04L 45/54; H04L 47/10; H04L 47/35; H04L 47/2441; H04L 47/2483; H04L 49/90; H04L 49/309; H04L 49/9042; H04L 67/147
See application file for complete search history.

(56) References Cited

U.S. PATENT DOCUMENTS

| | | | |
|---|---|---|---|
| 2017/0255559 A1* | 9/2017 | Burstein | ............. G06F 12/0833 |
| 2019/0034381 A1 | 1/2019 | Burstein et al. | |

* cited by examiner

FIRST DEDICATED PACKET TYPE FOR FLUSH COMMAND

| | +0 | +1 | +2 | +3 |
|---|---|---|---|---|
| | 7 6 5 4 3 2 1 0 | 7 6 5 4 3 2 1 0 | 7 6 5 4 3 2 1 0 | 7 6 5 4 3 2 1 0 |
| Byte 0 → | Fmt / Type<br>1 0 1 / 1 0 0 0 0 0 | T9 / TC / T8 Attr LN TH | TD EP Attr AT | Length |
| Byte 4 → | Requestor ID | | Tag | Reserved |
| Byte 8 → | Flush Address[63:32] | | | |
| Byte 12 → | Flush Address[31:2] | | | RsvD |
| Byte 16 → | Address range limit[31:0] | | | |
| Byte 20 → | Reserved | Flsh Addr [1:0] / Flpt / Fltyp | Address range limit[47:32] | |

FIG. 12A — 650

SECOND DEDICATED PACKET TYPE FOR FLUSH COMMAND

| | +0 | +1 | +2 | +3 |
|---|---|---|---|---|
| | 7 6 5 4 3 2 1 0 | 7 6 5 4 3 2 1 0 | 7 6 5 4 3 2 1 0 | 7 6 5 4 3 2 1 0 |
| Byte 0 → | Fmt / Type<br>1 0 1 / 1 0 0 0 0 0 | T9 / TC / T8 Attr LN TH | TD EP Attr AT | Length |
| Byte 4 → | Requestor ID | | Tag | Reserved |
| Byte 8 → | Flush Address[63:32] | | | |
| Byte 12 → | Flush Address[31:2] | | | RsvD |
| Byte 16 → | Reserved | | Flow ID [19:0] | |
| Byte 20 → | Reserved | Flsh Addr [1:0] / Flpt / Fltyp | Reserved | |

FIG. 12B — 670

APPARATUS AND METHOD FOR PROCESSING FLUSH REQUESTS WITHIN A PACKET NETWORK

BACKGROUND

The present technique relates to an apparatus and method for processing flush requests within a packet network.

An agent, for example software executing on a computer, may issue a series of write requests seeking to write data to memory. The agent may at some point wish to ensure that such write data has reached a point of persistence within the memory system. The point of persistence can take a variety of forms. For example, a memory device that will retain its content even after power is removed from the memory device, an example of which would be non-volatile memory, will be a point of persistence. However, in addition to such a memory device, other structures within a system can also be a point of persistence. For example, certain queue structures or certain cache structures can be viewed as a point of persistence if they are provided with sufficient backup power to ensure that the write date therein can be migrated to a suitable persistent memory device in the event of an interruption in the main power supply.

Since there can be some delay between the issuance of a write request and the associated write data actually reaching such a point of persistence, for example due to the write data being held in certain queues along the path between the agent and the point of persistence, it can be desirable for the agent to be able to issue a flush request to cause the relevant write data to be flushed through to a point of persistence.

An issue that can arise is that the agent may be located remotely from the entity containing the point of persistence, such an entity being referred to herein as a persistence domain. In particular, there can be intervening networks between the remote agent and the persistence domain. An example of such a network is a packet network that uses a packet protocol in order to transmit packets across the network from sources to recipients. Typically, such a packet network is not able to distinguish flush requests from other requests, and instead a flush request issued by the remote agent to such a packet network will be treated by the packet network as a write request, and cause a write command to be propagated through the packet network for output into a queue/software stack within the persistence domain, with that write into the queue causing software within the persistence domain to then be invoked to perform the required flush operation to the point of persistence. However, it has been found that this process is very slow, due to the need to write into a queue structure within the point of persistence and thereafter invoke software in order to perform the flush operation.

Accordingly, it would be desirable to provide an improved mechanism for processing flush requests generated by an agent that is remote to the persistence domain.

SUMMARY

In a first example arrangement, there is provided an apparatus comprising: a requester device within a packet network to receive a flush request generated by a remote agent requesting that one or more data items be flushed to a point of persistence, and to translate the flush request into a packet-based flush command conforming to a packet protocol of the packet network; and a completer device within the packet network that is coupled to a persistence domain incorporating the point of persistence, the completer device being arranged to detect receipt of the packet-based flush command and to trigger a flush operation within the persistence domain to flush said one or more data items to the point of persistence.

In a second example arrangement, there is provided a requester device for use in a packet network to receive a flush request generated by a remote agent requesting that one or more data items be flushed to a point of persistence, the requester device comprising translation circuity to translate the flush request into a packet-based flush command conforming to a packet protocol of the packet network, for onward transmission through the packet network to a completer device used to trigger a flush operation within a persistence domain incorporating the point of persistence.

In a yet further example arrangement, there is provided a completer device for use within a packet network, the completer device have flush operation trigger circuitry, responsive to receipt by the completer device of a packet-based flush command conforming to a packet protocol of the packet network, to trigger a flush operation within a persistence domain in order to flush one or more data items identified by the packet-based flush command to a point of persistence within the persistence domain.

In a still further example arrangement, there is provided a method of operating a packet network to process flush requests, comprising: receiving at a requester device within the packet network a flush request generated by a remote agent requesting that one or more data items be flushed to a point of persistence; translating, at the requester device, the flush request into a packet-based flush command conforming to a packet protocol of the packet network; transporting the packet-based flush command through the packet network to a completer device that is coupled to a persistence domain incorporating the point of persistence; and arranging the completer device, responsive to detecting receipt of the packet-based flush command, to trigger a flush operation within the persistence domain to flush said one or more data items to the point of persistence.

In another example arrangement there is provided an apparatus comprising: requester means within a packet network for receiving a flush request generated by a remote agent requesting that one or more data items be flushed to a point of persistence, and for translating the flush request into a packet-based flush command conforming to a packet protocol of the packet network; and completer means within the packet network that is coupled to a persistence domain incorporating the point of persistence, the completer device for detecting receipt of the packet-based flush command and for triggering a flush operation within the persistence domain to flush said one or more data items to the point of persistence.

BRIEF DESCRIPTION OF THE DRAWINGS

The present technique will be described further, by way of illustration only, with reference to examples thereof as illustrated in the accompanying drawings, in which:

FIGS. 12A and 12B illustrate different dedicated packet types that can be used for flush commands in accordance with an alternative implementation.

DESCRIPTION OF EXAMPLES

Figure 1:
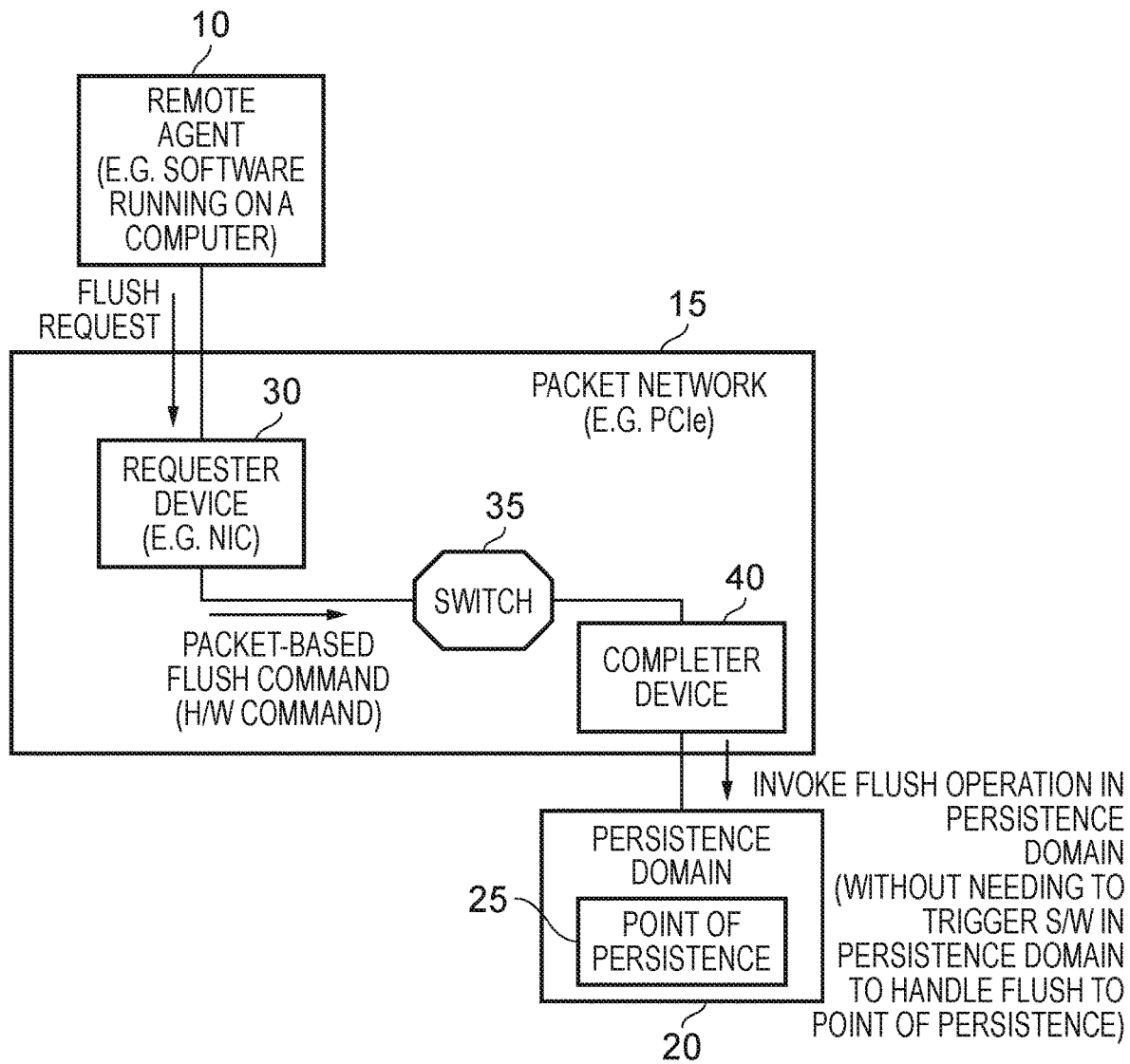
FIG. 1 provides a schematic illustration of an apparatus in accordance with one example implementation.

In accordance with one example arrangement, an apparatus is provided that has a requester device within a packet network to receive a flush request generated by a remote agent requesting that one or more data items be flushed to a point of persistence. The one or more data items can be identified in a variety of ways, but will typically relate to data that has been the subject of preceding write operations, and the flush request is issued by the remote agent to seek to ensure that those data items are pushed through to the point of persistence, so that it can be ensured that those data items will persist if there is subsequently an interruption in power. Whereas in accordance with previous techniques, the requester device would not distinguish such a flush request from any other type of write request, and would merely push a write command through the packet network in order to cause an update to be made to a queue structure such as a software stack within the domain containing the point of persistence, in accordance with the techniques described herein the requester device is arranged to recognise the flush request and translate the flush request into a packet-based flush command conforming to a packet protocol of the packet network.

The apparatus further includes a completer device within the packet network that is coupled to a persistence domain incorporating the point of persistence and hence acts as the interface between the packet network and the persistence domain. Since the flush request was translated into a packet-based flush command by the requester device, the completer device is able to detect when the packet-based flush command is received, and be responsive to receipt of that packet-based flush command to trigger a flush operation within the persistence domain to flush the one or more data items to the point of persistence.

Hence, through use of the above described technique, rather than relying on a software stack within the system that has the persistence domain being invoked in order to perform a flush operation, a faster hardware method is provided for invoking the flush operation, by supporting a specific packet-based flush command conforming to the packet protocol in the packet network, thus enabling the flush operation to be directly triggered by the completer device within the packet network. This can significantly increase the performance of the handling of flush requests from remote agents (and may for example provide orders of magnitude improvement), hence reducing the time delay between issuance of the flush request and actioning of the flush operation required to implement that flush request. This hence provides significantly enhanced reliability, increasing the likelihood of data items being flushed to a point of persistence in a timely manner to avoid that data being lost in the event of an interruption in power. This also provides higher throughput and lower latency for software applications.

In one example arrangement, the packet-based flush command forms a native command of the packet network which is distinguished by devices of the packet network from other native commands routed through the packet network. As such, the packet-based flush command can be recognised by the hardware components in the packet network as relating to the requirement for a flush operation, whereas previously the components within the packet network would have no knowledge of the flush request, and the flush request would merely be handled by the propagation of a write command to a memory address through the packet network.

The packet network can take a variety of forms, as can the packet protocol used within the packet network. However, in one example arrangement the packet protocol is the Peripheral Component Interconnect Express (PCIe) protocol and the packet-based flush command forms a transaction layer command. Hence, in accordance with such an implementation, the above-described techniques enable use of transaction layer packets (TLPs) within the transaction layer of a PCIe network to implement packet-based flush commands that are recognisable by the components of the packet network, and in particular are distinguishable from other native commands that are routed through the packet network. As a result, the completer device is able to detect receipt of such a packet-based flush command and trigger a flush operation as discussed earlier.

In one example implementation, the packet-based flush command is arranged to identify a flush type. As a result, it is possible to use the mechanism described above to implement a variety of different types of flush operation. In one example implementation, the flush type is used to distinguish between an address-based flush type where the one or more data items to be flushed are identified by an address range determined by the completer device from address information provided with the packet-based flush command, and an alternative flush type. This hence provides significant flexibility when implementing flush operations. In particular, it allows a sequence of addresses to be identified, such that any data items being written to those addresses are flushed to the point of persistence, but also support at least one alternative form of flushing to be implemented.

The alternative form of flushing can take a variety of forms. However, in one example implementation, the alternative flush type is a flow identifier flush type where a flow identifier is provided within the packet-based flush command, and the one or more data items to be flushed are those data items within the persistence domain that have not yet reached the point of persistence and which have the flow identifier associated therewith. Hence, as individual data items are output for writing to memory, a flow identifier value can be associated with those data items and subsequently a flush request can specify that flow identifier, such that the flow identifier is used as a mechanism to identify the data items that need to be flushed to the point of persistence. The use of flow identifiers can then be managed by the remote agent, and provides a particularly flexible mechanism for determining the data items that should be subjected to any particular flush request.

In order to support the use of flow identifiers, the write data commands used to write data can be enhanced so as to support the use of flow identifiers. In particular, in one example arrangement one or more devices within the packet network are arranged to generate write data commands for transfer over the packet network to the completer device, and in order to support the flow identifier flush type are arranged to generate a write data command formed by a flow identifier prefix and at least one associated write data packet, with the flow identifier prefix containing an indication of a flow identifier associated with each item of write data contained in the at least one associated write data packet. By such an approach, the form of the write data packet can be left "as is", and hence a different form of write data packet is not required dependent on whether flow identifiers are being used or not. Instead, a separate flow identifier prefix can be used that, when appearing prior to an associated write data packet, identifies a flow identifier to be used in association with the write data that is the subject of that write data packet. This flow identifier information can then be propagated on into the persistence domain, so that it is provided in association with the write data as that write data passes through the various structures within the persistence domain.

In one example arrangement, a flow identifier prefix applies only to an immediately following write data packet. However, if desired, a flow identifier prefix may be arranged to be associated with one or more write data packets following that flow identifier prefix, which may allow for a more efficient encoding of flow identifiers by avoiding the need to repeat the flow identifier prefix before every write data packet with which the flow identifier is to be associated.

It is possible for multiple different flow identifier values to be in use at the same time, and then for a given flush request to relate to a specific flow identifier value, so that only the write data items that are associated with that specific flow identifier value are then subjected to the flush operation. However, in one example implementation, it may be possible to reserve a particular predetermined value of flow identifier so that it can be used to cause a more global flushing of data items. In particular, in one example implementation, when the flow identifier provided within the packet-based flush command has a predetermined value, the completer device is arranged to interpret the packet-based flush command as relating to all data items within the persistence domain that have not yet reached the point of persistence and which have any value of flow identifier associated therewith. Hence, through the use of a single flush request, it is possible in that instance to flush all of the data items that have an associated flow identifier to the point of persistence, irrespective of the particular flow identifier value associated with any of those data items. This can provide enhanced flexibility in the use of the flush requests by allowing flush requests to be targeted to particular flow identifiers, or for a single flush request to target all flow identifiers.

The flow identifier prefix can take a variety of forms, but in one example implementation is an end-to-end prefix that is routed with the associated write data packet through the packet network to the completer device via any intervening devices of the packet network. Through use of such an end-to-end prefix, the prefix can be routed through the packet network unmodified so that it can be received at the completer device in the original form generated by the requester device.

In one example implementation, the packet-based flush command may be arranged to provide a flush point indication used to identify a point of persistence level to which the one or more data items are to be flushed. In particular, in some systems there may be multiple different levels that are all viewed as points of persistence. For example, the flush point may be used to distinguish between a shallow flush to a first point of persistence and a deep flush to a second point of persistence more resilient to hardware failure than the first point of persistence. The second point of persistence will be more resilient in terms of its resilience to interruption in power and/or its resilience in terms of its reliability. Purely by way of example, a non-volatile memory device may be used as a deep point of persistence in that it provides a very reliable point of persistence. However, other intervening structures prior to the non-volatile memory may also provide a point of persistence, for example by being supplemented with additional backup power supply components to ensure that in the event of an interruption in power any data at those levels of persistence can be written to the non-volatile memory. Purely by way of specific example, certain system caches may be viewed as providing a point of persistence, as for example could some of the queue structures within a memory controller, provided suitable components are provided in association with those storage structures to ensure that the contents stored therein can be written to non-volatile memory in the event of an interruption in power.

In one example implementation the requester device comprises translation circuitry to translate the flush request into the packet-based flush command such that the packet-based flush command comprises at least a packet for transmission through the packet network to the completer device.

The manner in which the translation circuitry generates the packet-based flush command can vary dependent on implementation. In one example implementation, the translation circuitry is arranged to generate a flush prefix and at least one associated packet to form the packet-based flush command, wherein the associated packet is of a type also used for another form of command within the packet network, and the flush prefix is used to cause the completer device to interpret the flush prefix and the associated packet as collectively forming the packet-based flush command. Hence, in accordance with such an implementation another form of packet is not required, and an existing packet type can be used, but with a flush prefix being associated with that packet to cause the completer device to interpret that associated packet differently.

The form of packet that is reused in such a manner, in combination with the flush prefix, to form the packet-based flush command may vary dependent on implementation, but in one example case the associated packet is of a type also used for a read command within the packet network. Hence, in the absence of an associated flush prefix, the packet will be viewed as a read packet, but in combination with the flush prefix that packet will be viewed as forming a packet-based flush command.

In one example arrangement, the flush prefix only applies to the immediately following packet. However, in an alternative embodiment, a single flush prefix can be arranged to be associated with two or more following packets, causing each of those packets to be viewed as forming a packet-based flush command in combination with the flush prefix contents.

As with the earlier described flow identifier prefix, in one example arrangement the flush prefix may be an end-to-end prefix that is routed with the associated packet through the packet network from the requester device to the completer device via any intervening devices of the packet network.

The information maintained within the flush prefix can vary dependent on implementation, but generally is used to provide additional information required to control the flush operation that cannot be provided directly within the associated packet due to the associated packet being of a type that is also used for another form of command within the packet network.

In one example implementation, the flush prefix comprises a type field to identify a flush type used to distinguish between an address-based flush type where the one or more data items to be flushed are identified by an address range determined by the completer device from address information provided with the packet-based flush command, and an alternative flush type. As discussed earlier, the alternative flush type can take a variety of forms, but in one specific example is a flow identifier flush type.

In one example implementation the flush prefix may comprise an attribute field, and the information maintained in that attribute field may vary dependent on the flush type identified in the flush prefix. For example, the completer device may be arranged, when performing an address-based flush in response to the packet-based flush command (i.e. where the flush type is an address-based flush type), to use address information provided in the attribute field of the flush prefix, in combination with further address information provided in the associated packet, to determine an address range used to identify the data items to be flushed. If instead the type field within the flush prefix indicated that the flush type was a flow identifier flush type, then the attribute field can be used to capture the flow identifier rather than provide address information.

In implementations where the attribute field provides address information, then in one particular example arrangement the further address information provided in the associated packet comprises at least an indication of a start address, and the address information from the attribute field of the flush prefix is used to identify a range of addresses starting from the start address. Hence, whilst the start address can be determined from the information in the packet (which as discussed earlier may be a standard read packet), the range information can be determined from the additional address information provided by the flush prefix.

In a further example arrangement, in order to extend the possible range that can be encoded within the packet-based flush command, the further address information provided in the associated packet may include a length field that can be used to provide a value also indicative of range. In particular, the value provided in the length field may be used in combination with the address information from the attribute field of the flush prefix to determine the range of addresses. Due to the additional information that can be provided in the length field, this can enable a larger range of addresses to be captured within the packet-based flush command.

In one example implementation, the flush prefix can also provide a flush point field used to identify a point of persistence level to which the one or more data items are to be flushed, and hence for example the flush prefix can identify whether the flush operation is to be performed to a shallow point of persistence or a deep point of persistence.

As an alternative to forming the packet-based flush command using a flush prefix and an existing type of packet already supported for another purpose (for example a read packet as discussed earlier), the translation can alternatively be arranged to employ at least one dedicated packet type to form the packet-based flush command. In such an arrangement, there is no need for a flush prefix, but a different type of packet needs to be supported within the packet network.

In one example arrangement, a first dedicated packet type may be used to identify a packet-based flush command of an address-based flush type, and a second dedicated packet type may be used to identify a packet-based flush command of a flow identifier flush type. Hence, different packet types can be used dependent on whether an address based flush or a flow identifier based flush is to be performed.

When using the first dedicated packet type, that packet may comprise address information sufficient to determine a range of addresses identifying the one or more data items to be flushed. Hence, in a specific implementation, that address information may identify a start address and further address information used to identify a range of addresses starting from that start address.

When using the second dedicated packet type, that packet may comprise a flow identifier field to provide a flow identifier, and the one or more data items to be flushed are those data items within the persistence domain that have not yet reached the point of persistence and which have the flow identifier associated therewith.

When using either the first dedicated packet type or the second dedicated packet type, a flush point field may be provided in such packets to identify a point of persistence level to which the one or more data items are to be flushed.

In one example arrangement, it is useful for the remote agent to be informed about the completion of the flush operation in response to its flush request. Hence, in one example arrangement the completer device is arranged, on detecting completion of the flush operation within the persistence domain, to send a completion acknowledgement packet through the packet network to the requester device. Whilst the completion acknowledgement packet can take a variety of forms, in one particular implementation an existing packet format for completion information is reused for this purpose, and hence there is no need to develop a new form of packet in order to provide the completion information back to the requester device.

In one example arrangement, the ability of the requester device and the completer device to manage the flush commands discussed earlier can be made configurable by software. In particular, each of the requester device and the completer device may be provided with one or more configuration registers in which configuration information may be stored to identify whether those devices are enabled to handle the packet-based flush command. This allows configurability, by enabling this additional functionality to be enabled or disabled as desired. In the event that the configuration of certain elements is incompatible, for example the requester device is enabled to generate packet-based flush commands, but the target completer device is not enabled to process such commands, then an error will be signalled, for example when the completer device receives the packet-based flush command that it cannot process.

The way in which the configuration information is stored into the configuration registers may vary dependent on implementation. For example, in one particular implementation software may be used to perform an enumeration process in order to discover and configure the devices within the packet network, and during this enumeration process the configuration information may be stored into the configuration registers to identify the capabilities of the various devices with respect to the handling of packet-based flush commands. Hence, the provision of the configuration registers can allow software the ability to control and configure the flush capabilities of the packet network.

Particular examples will now be described with reference to the Figures.

FIG. 1 is a block diagram of a system in which the techniques described herein may be employed. In particular, a remote agent 10, which may for example take the form of software running on a personal computer or a server, is communicating with a persistence domain 20 via a packet network 15. The packet network can take a variety of forms, but for the purpose of the examples described herein it will be assumed that the packet network is a PCIe network.

The persistence domain 20 includes at least one point of persistence 25, the point of persistence being a storage device arranged such that once data has reached that storage device, that data should persist in the event of an interruption in power supply. The point of persistence 25 can take a variety of forms, and may for example be a memory device that retains data in the presence of power being removed from the memory device, an example being non-volatile (NV) memory. Alternatively, the point of persistence may be at a higher level than the non-volatile memory device, and in particular may be a storage device which does not inherently have persistence, but which is provided with additional mechanisms to ensure that once the data has reached that point, then in the event of an interruption in the power supply the data at that point can be migrated to non-volatile memory. Hence, by way of example, in some instances a particular level in a cache hierarchy, for example a system cache, may be provided with backup power such that in the event of an interruption in the power supply to the device containing the system cache, the system cache still has access to a power supply sufficient to enable it to migrate its data to a permanent point of persistence such as non-volatile memory. Similarly, one or more of the queue structures within a memory controller may be arranged in this way so that those queues become a point of persistence.

The remote agent 10 may be arranged to write data to memory within the persistence domain 20 via the packet network 15, and at some point may wish to ensure that that write data has reached the point of persistence 25. In particular, it will be appreciated that there may be a number of buffer stages along the path to the point of persistence, and hence it is possible that there may be some significant delay between write requests being issued, and that data actually reaching a point of persistence. For example, in some instances that data could be cached at a higher level in the cache hierarchy, and hence not reach the point of persistence until that data is evicted from the cache. Similarly, queue structures can take a significant amount of time to drain, and accordingly write data may be retained within such queue structures for a prolonged period.

To seek to initiate a flush of one or more data items to the point of persistence 25, the remote agent 10 can issue a flush request. A number of existing techniques can be used for such a flush request, and by way of example a Remote Data Memory Access (RDMA) flush request may be issued by the remote agent.

In a typical packet network such as the PCIe network, such a flush request is merely treated as a write request to memory, and propagated through the PCIe network as a write request, resulting in the request being written into a queue structure within the persistence domain. The queue structure may for example be a software stack and as a result of the write into that software stack, software within the persistence domain can be invoked in order to undertake the required flush operation. However, this software based mechanism has been found to be slow, and hence there can be a significant delay between the flush request being issued and the flush operation being performed. In accordance with the techniques described herein, an alternative mechanism is implemented that enables a quicker performance of flush operations in response to a flush request issued by a remote agent.

It should be noted that in FIG. 1 the agent 10 is referred to as a remote agent, since it is remote from the persistence domain 20 containing the point of persistence 25, and in particular is separated from the persistence domain 20 by at least the packet network 15.

In accordance with the techniques described herein, the remote agent 10 can issue a flush request to the packet network 15, where it will be received by a component 30 within the packet network. This component could take a variety of forms, but in one example may be a network interface card (NIC). Rather than the flush request merely being propagated on through the PCIe network as a write request to memory, instead the device 30 is able to detect that the request is a flush request, and is provided with a mechanism for creating a packet-based flush command that conforms to the packet protocol of the packet network, in this case the PCIe protocol. In particular, it is proposed to extend the native commands available within the PCIe network to include a new native command that is identified as representing a flush command, and this packet-based flush command can then be routed through the packet network 15 via one or more intervening components to a component 40 that provides an interface to the persistence domain 20. For the sake of simplicity, a switch 35 has been shown between the device 30 and the device 40, but it will be appreciated that in a typical PCIe network there could be more devices in the path between the device 30 and the device 40, or alternatively there could be a direct path between the device 30 and the device 40.

In the description that follows, the device 30 that generated the packet-based flush command in response to the received flush request is referred to as the requester device, and the device 40 that interfaces to the persistence domain 20 is referred to as the completer device since it is responsible for responding to the packet-based flush command.

In particular, the completer device 40 will detect the packet-based flush command, since as mentioned earlier the packet-based flush command will be a native command supported by the PCIe network, and hence is distinguishable by components such as the completer device 40 from other forms of native commands that can be routed through the PCIe network. Such native commands may also be referred to herein as hardware commands, since they are commands that are recognised by the hardware components within the packet network 15.

The completer device 40 is responsive to detecting receipt of a packet-based flush command to trigger a flush operation within the persistence domain 20 in order to flush one or more data items identified by the packet-based flush command to the point of persistence 25. There are a number of ways in which the data items to be flushed can be identified within the packet-based flush command. As will be discussed in more detail herein, in one example a series of addresses can be determined with reference to the information provided within the packet-based flush command, such that any data items being written to those addresses that have not yet reached the point of persistence 25 can be subjected to a flush operation within the persistence domain in order to cause those data items to be flushed through to that point of persistence 25. In an alternative arrangement, flow identifiers can be associated with individual items of write data, and the packet-based flush command can specify a flow identifier, such that the completer device 40 will then cause a flush operation to be invoked in respect of all items of write data having the associated flow identifier that have not yet reached the point of persistence 25 within the persistence domain 20.

Since the completer device is able to distinguish the packet-based flush command from other native commands that may be routed through the packet network, and hence can analyse the packet-based flush command in order to directly invoke the required flush operation within the persistence domain 20, there is no longer any need to trigger software in the persistence domain to handle the flush to the point of persistence 25, and accordingly through use of this mechanism a significant improvement in the performance of the flush operation can be achieved, significantly reducing the delay between the remote agent 10 issuing the flush request and the required flush operation being performed within the persistence domain 20.

Figure 2A:
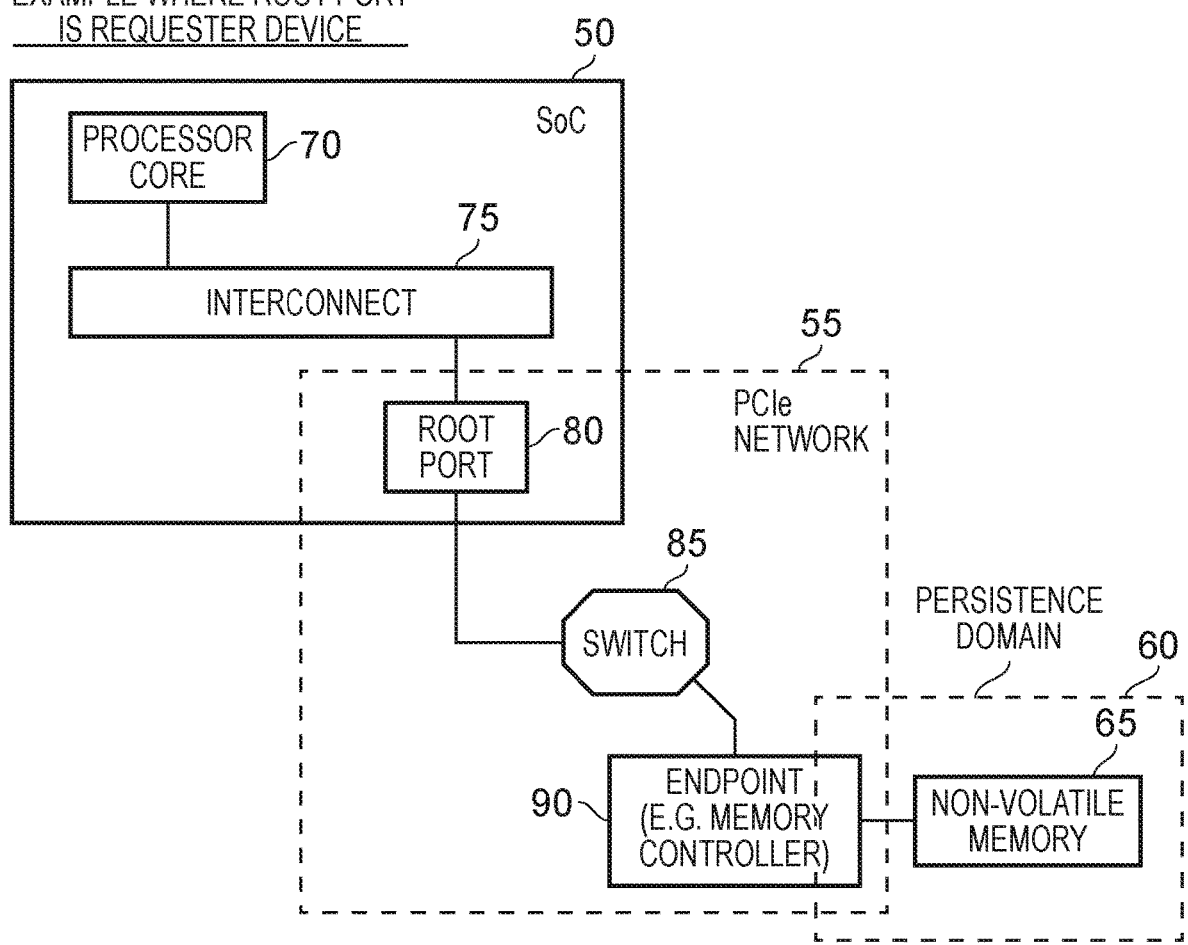
FIGS. 2A and 2B illustrate two specific example systems arranged to incorporating an apparatus utilising the presently described techniques.
Figure 2B:
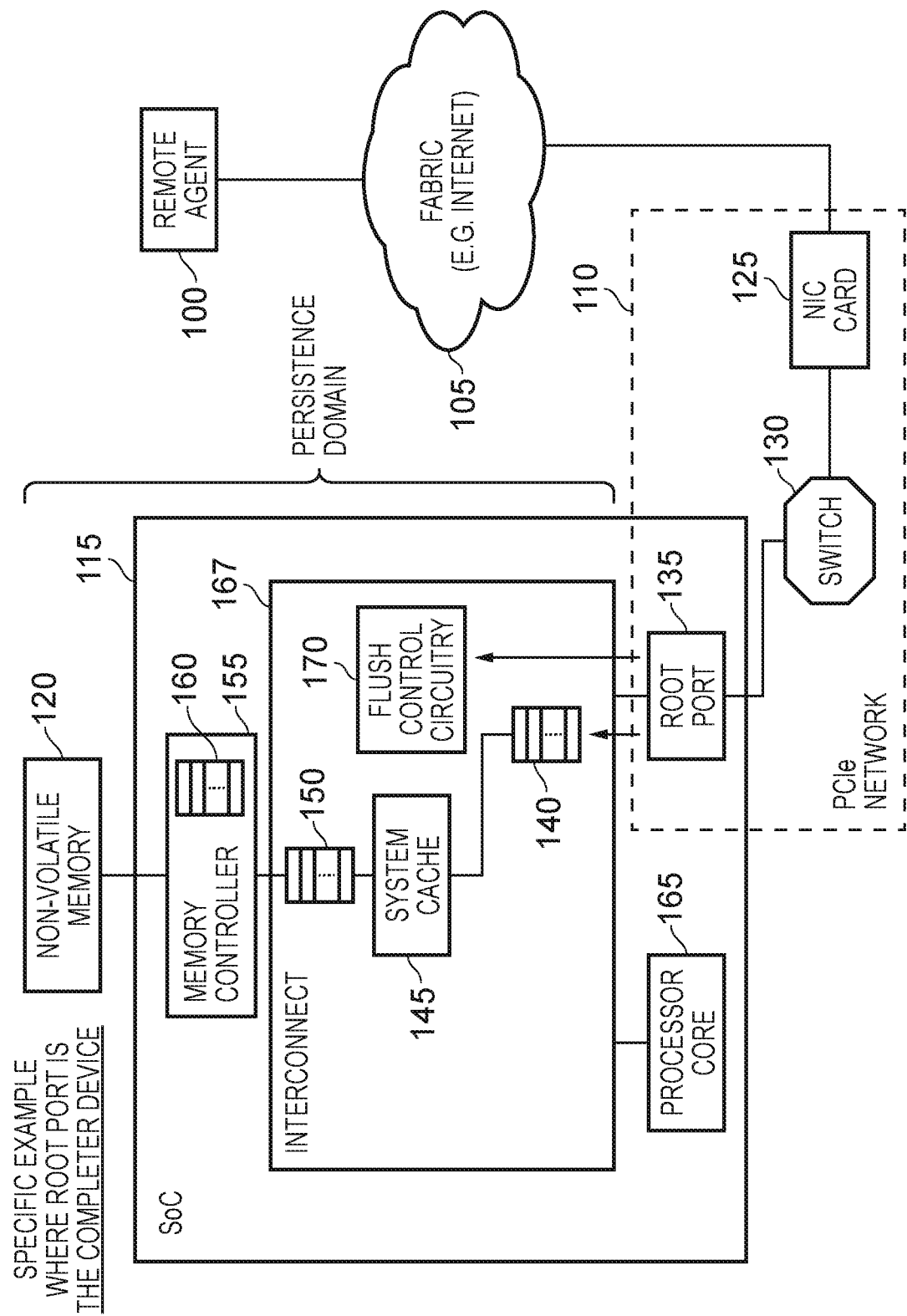

It will be appreciated that FIG. 1 provides a schematic illustration of the system, and the actual arrangement of components within the system can vary significantly dependent on implementation. Two specific example systems are shown in FIGS. 2A and 2B. In the example of FIG. 2A, a System-on-Chip (SoC) 50 is coupled to persistence domain 60 via a PCIe network 55. In particular, the SoC 50 is connected to a root port 80 of the PCIe network 55, the root port 80 forming a root complex device that connects the processing capabilities and memory subsystem of the SoC to the PCIe network 55. For simplicity, the detailed components within the SoC are omitted, but a processor core 70 is shown connected via an interconnect 75 to the root port 80, and the processor core 70 (or at least the software executing on that processor core) may be viewed as a remote agent that may issue a series of write requests to the non-volatile memory 65 within the persistence domain 60, and then subsequently wish to issue a flush request to ensure that those items of write data have been flushed to the non-volatile (NV) memory 65, in this example the non-volatile memory 65 being viewed as the point of persistence.

In this example it is assumed that the memory controller used to control access to the non-volatile memory 65 is provided by an endpoint device 90 within the PCIe network 55, and is coupled to the root port 80 via one or more intervening components, in the particular illustration in FIG. 2A an intervening switch 85 being provided.

It will be appreciated that there can be a number of intervening queue structures prior to the non-volatile memory 65, even in the relatively simple implementation shown in FIG. 2A. For example, the memory controller 90 may include a number of different levels of queuing structures, for example a receive queue into which commands are initially received, and one or more intervening queues prior to data actually being propagated onto the NV memory 65. Depending on the implementation, one or more of the components within the endpoint device 90 may be viewed as being within the persistence domain 60, as per the schematic illustration in FIG. 2A, or alternatively the endpoint device 90 may be viewed as being entirely external to the persistence domain, with the endpoint device then communicating with the persistence domain in order to ensure the flushing of the required data items to the NV memory 65.

As mentioned earlier, whilst the NV memory 65 will be a point of persistence, it may not be the only point of persistence within the system. For example there may be at least a final level of queuing within the memory controller 90 that is provided with backup power capabilities to enable that queue structure to be viewed as a point of persistence, in that it is known that once the data has reached that point, it should be possible to migrate that data to the NV memory 65 in the event of a power failure.

Hence in the example of FIG. 2A, the processor core 70 may issue a flush request that is routed via the interconnect 75 to the root port 80. The root port then recognises the receipt of the flush request, and translates that flush request into a packet-based flush command conforming to the PCIe protocol of the PCIe network 55. That native command is then routed through the infrastructure of the PCIe network where it is received by the endpoint 90. The endpoint 90 then recognises the command as being a flush command and analyses the contents of the flush command in order to issue appropriate control signals into the persistence domain to cause the required data items to be flushed to the point of persistence. In the event that there is more than one point of persistence within the persistence domain, the original flush request can identify which point of persistence is being targeted, and that information can be captured within the packet-based flush command that is routed through the PCIe network, so that the endpoint can then issue the appropriate control signals to ensure that the data is flushed to the appropriate point of persistence, for example to the NV memory 65, or to a queue structure in the memory controller that is arranged such that it can operate as a point of persistence.

In the example of FIG. 2A it will be appreciated that the root port 80 becomes the requester device, and the endpoint 90 performs the operation of the completer device. FIG. 2B illustrates an alternative example implementation where the root port forms the completer device, and the persistence domain is associated with the SoC 115 in which the root port is provided.

In the example of FIG. 2B, a remote agent 100 is arranged to issue a flush request directed to the persistence domain, via an intervening PCIe network 110. In the example shown in FIG. 2B, the remote agent is not directly connected to the PCIe network, but instead is coupled to the PCIe network via an intervening fabric 105. The fabric 105 can take a variety of forms, but could for example be the Internet. Hence the flush request is routed via the Internet to an interface device of the PCIe network 110, in this example the NIC card 125. The NIC card 125 acts as the requester device in this implementation and maps the flush request to the earlier-mentioned native command now provided by the PCIe network to represent a flush, i.e. the earlier-mentioned packet-based flush command. That command is then routed via the switch 130 to the root port 135 associated with the persistence domain that is being targeted by the flush request.

A variety of storage structures are shown within the SoC 115 of FIG. 2B to illustrate the various places with which write data may be buffered prior to it reaching the non-volatile memory 120. In particular, write data that has previously been the subject of write requests issued by one or more remote agents coupled to the SoC 115 via the PCIe network 110 may be routed through an input queue structure 140 of the interconnect 167, from where it may be propagated via a system cache 145 into one or more output queue structures 150 of the interconnect, and from there onto the memory controller 155, which itself may include some internal queue structures 160, before the data is finally written into the non-volatile memory.

When the root port 135 receives the packet-based flush command, it recognises that command as being a flush command, and can analyse the content of the flush command in order to generate control signals sent to flush control circuitry 170 within the SoC 115. The exact location of the flush control circuitry may vary dependent on implementation, and indeed may be distributed at a variety of locations within the SoC rather than being a single centralised flush control circuit. In another example implementation, the flush control circuitry 170 may be implemented within the root port 135. However the flush control circuitry 170 is implemented, it is provided to control the performance of flush operations within the SoC 115, allowing content within the various queue/storage structures of the SoC to be flushed to a point of persistence. It may be that only the NV memory 120 is a point of persistence within the persistence domain, or it may be that one or more of the other storage structures can also provide a point of persistence. For example, the queue structures 160 within the memory controller may be a point of persistence if suitable backup power is provided. Similarly, in some implementations the system cache can also be viewed as a point of persistence, since it may be provided with suitable backup power to enable the contents of the system cache to be written out to NV memory 120 in event of an interruption in power supply.

Due to the fact that the root port 135 can recognise the packet-based flush command routed via the PCIe network, it can then analyse the contents of that packet-based flush command and communicate directly with the flush control circuitry 170 in order to implement the required flush operation. Hence, in contrast to the known prior art technique, there is no need to invoke software on the processor core 165 within the SoC in order to perform the required flush operation, since the PCIe network itself is "flush-aware" due to the ability to generate and propagate through the PCIe network a packet-based flush command that conforms to the PCIe protocol.

As mentioned earlier, flush requests can be targeted to particular data items. Hence, it may be the case that the remote agent 100 has issued a series of write requests to particular memory addresses within a memory address range, and then the subsequent flush request can provide address range information to identify those memory addresses. That address information can be captured within the internal packet-based flush command routed through the PCIe network 110, so that the root port 135 can then issue flush control signals to the flush control circuitry 170 specifying the required addresses that need to be subjected to a flush. The various intervening storage structures between the PCIe network 110 and the relevant point of persistence can then be reviewed in order to determine whether any of the relevant write data items are still within those structures, and in that event those data items can be flushed through to the point of persistence. Taking purely by way of example a situation where the queue structures 160 within the memory controller can act as a point of persistence, and those queue structures are identified as the point of persistence to which the flush request relates, then any relevant data items held within the queue structures 140, 150, or within the system cache 145, can be flushed through to the queue structures 160 via the flush control circuitry 170 responding to the control signals issued by the root port 135 based on its analysis of the packet-based flush command.

Figure 3:
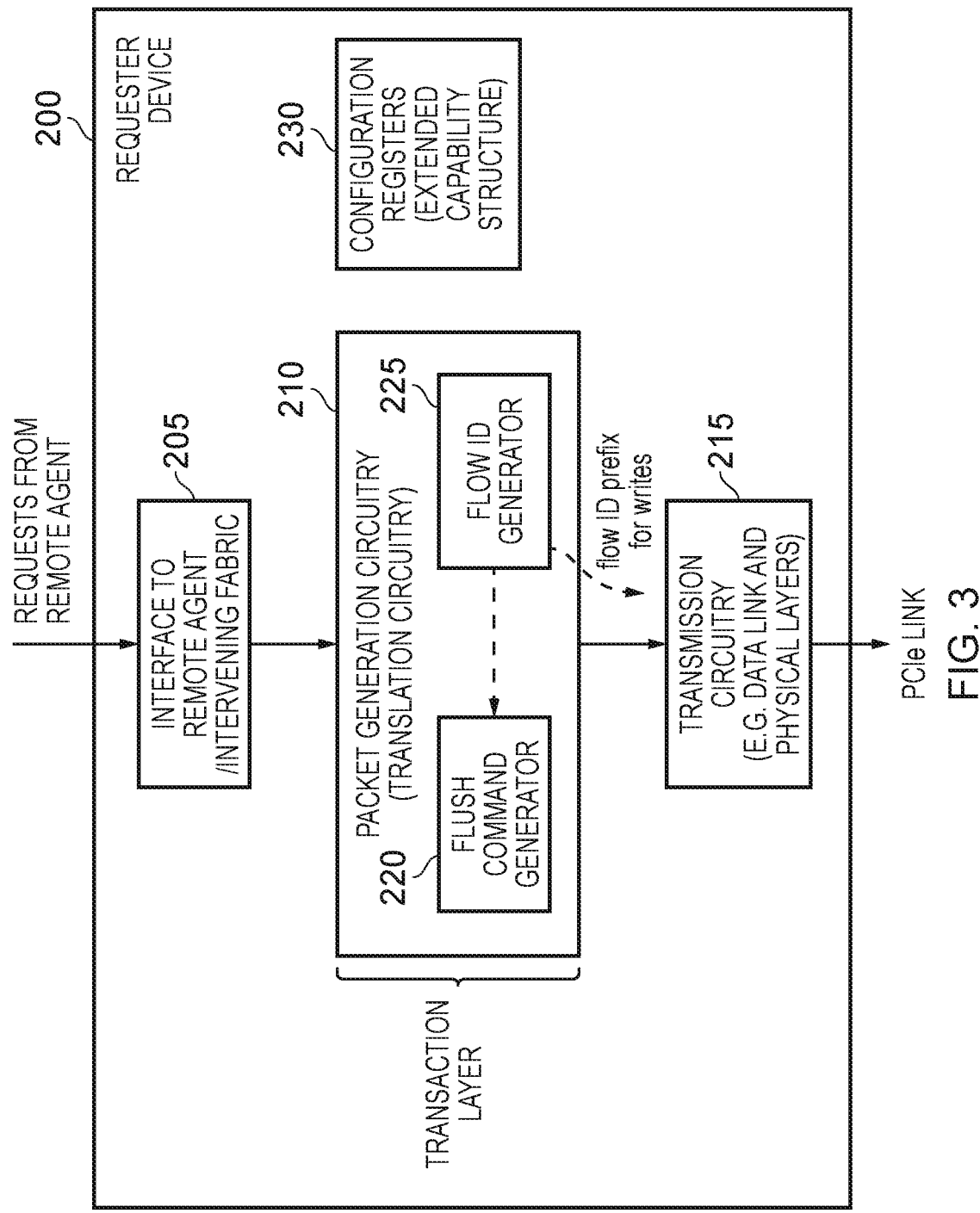
FIG. 3 is a block diagram illustrating components provided within a requester device of a packet network in accordance with one example arrangement.

FIG. 3 is a block diagram illustrating components that may be provided within the requester device of a PCIe network in order to implement the above described functionality. The requester device 200 has an interface 205 to the remote agent or the intervening fabric, via which it can receive requests from the remote agent. Requests received at the interface 205 are propagated onto the packet generation circuitry 210, also referred to herein as translation circuitry, which is provided as a transaction layer. The transaction layer is the starting point for the assembly of out-bound transaction layer packets (TLPs) and the endpoint for disassembly of inbound TLPs. For the purposes of illustration in FIG. 3, only the transmit path from the requester device into the PCIe network is shown, and the reception path is omitted, although it will be understood that information can also flow from within the PCIe network out via the requester device 200 to the remote agent or intervening fabric.

In order to support the above described functionality in respect of packet-based flush commands, a flush command generator 220 is provided within the packet generation circuitry 210. When an incoming request is identified as being a flush request, then the flush command generator 220 is arranged to generate an internal packet-based flush command to be routed via the PCIe network to represent that flush request. The exact form of the packet-based flush command can vary depending on implementation, and two different formats are described herein. The first involves adding a flush prefix to an already existing packet format, so that the flush prefix in combination with that associated packet is viewed as representing the packet-based flush command. In the absence of the flush prefix, the packet will be interpreted in its standard way. In the particular example that will be discussed later, the packet that can be reused to form the packet-based flush command is a read packet, and hence when the read packet is preceded by a flush prefix, the combination of the flush prefix and the read packet are viewed as a packet-based flush command. However, in an alternative implementation, such a flush prefix is not used, and instead a dedicated flush packet format is provided to enable a flush packet to be distinguished from alternative packets that may be routed through the PCIe network, for example read packets and write packets.

Transmission circuitry 215 is connected to the packet generation circuitry 210, for outputting the generated packets to the PCIe link of the requester device 200. The transmission circuitry can take a variety of forms, but in one example implementation will include the data link and physical layers provided by the PCIe protocol.

As also shown in FIG. 3, a flow ID generator 225 can be provided for providing flow identifier information in association with one or more of the packets routed via the transmission circuitry to the PCIe link. Flow identifiers can be identified by the remote agent, for associating with one or more write commands, and for including in flush commands so as to identify the data items that need to be subjected to a flush. The flow ID generator 225 may add a flow ID prefix to write packets that are issued via the transmission circuitry to the PCIe link, with those flow ID prefixes passing through the PCIe network in association with the write packets, so that those flow identifiers can also be propagated on into the persistence domain with the write data. A subsequent flush request can then identify a flow identifier that that flush request relates to, and the flush command generator 220 can generate a packet-based flush command that includes that flush identifier therein. At the completer device, that flush identifier can then be used to identify the write data items that need to be subjected to the flush operation.

In the example illustrated in FIG. 3, one or more configuration registers 230 can also be provided within the requester device in order to store configuration information to identify the features enabled within the requester device 200. In particular, the ability for the requester device to handle flush requests in the manner discussed above, and to use flow identifiers, can be made configurable through the use of the configuration registers 230. The configuration register content can be set in a variety of ways, but in one example implementation software that is used to perform an enumeration process when the PCIe network is booted up can be used in order to discover and configure the devices within the packet network, and to set the appropriate configuration information in the configuration registers to identify the flush capabilities of the various devices.

Figure 4:
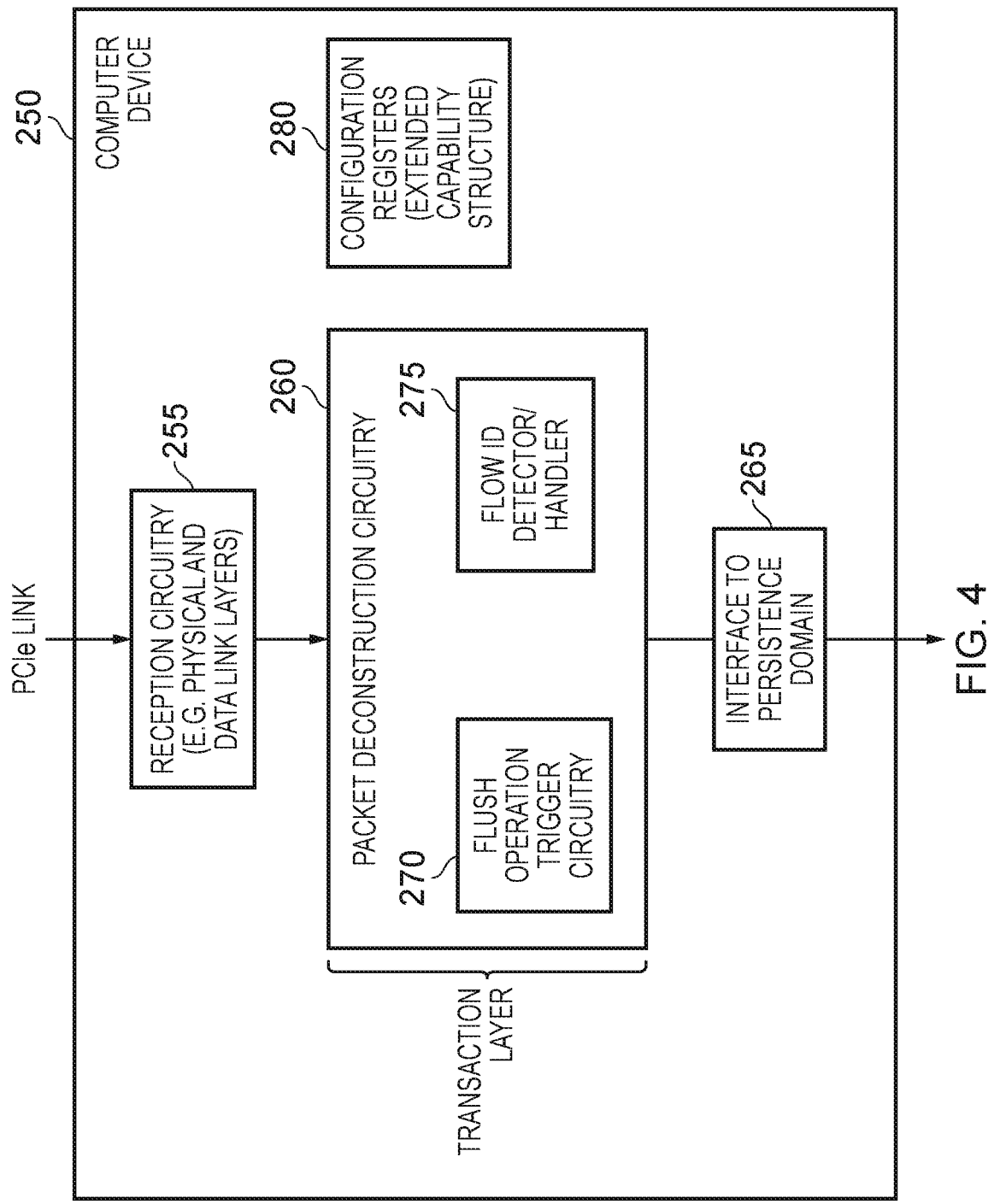
FIG. 4 is a block diagram illustrating components provided within a completer device of a packet network in accordance with one example arrangement.

FIG. 4 is a diagram illustrating components that may be provided within the completer device 250 in one example arrangement. Only the components associated with the receive path for receiving commands from the PCIe network, and generating control signals issued into the persistence domain, are shown. Reception circuitry 255 is provided to receive commands from the PCIe link, and as with the transmission circuitry 215 shown in FIG. 3, the reception circuitry 255 may include the physical and data layers.

Packet deconstruction circuitry 260 is then provided at the transaction layer to depacketise the received commands. In order to support the processing of packet-based flush commands, flush operation trigger circuitry 270 is provided that can detect when a received command is such a flush command, and in that instance analyse the information within the flush command in order to generate appropriate control signals for issuing via the interface 265 to the persistence domain. A flow identifier detector/handler 275 is also provided which can be used to detect the presence of flow identifier prefixes in association with write commands, and in that instance to extract the flow identifier and cause that flow identifier to be output with the write data and associated write address via the interface 265 to the persistence domain.

As with the requester device 200 discussed with reference to FIG. 3, the completer device 250 can include configuration registers 280 to store configuration information identifying the capabilities of the completer device, and in particular to identify its ability to handle flush commands.

The configuration registers 230 of FIG. 3 and 280 of FIG. 4 can take a variety of forms, but in one specific example are formed as an extended capability structure identifying an extended capability of the associated device, in this instance identifying its ability to process and handle flush requests, and optionally flow identifiers. It should be noted that it is not necessary for a device that is enabled to handle flush operations to also be able to handle flow identifiers, since as discussed earlier flush requests do not need to make use of flow identifiers, since address-based flushing can instead be used. Hence, the use of flow identifiers is an optional additional capability that can be layered on top of a device's ability to handle flush operations.

Figure 5:
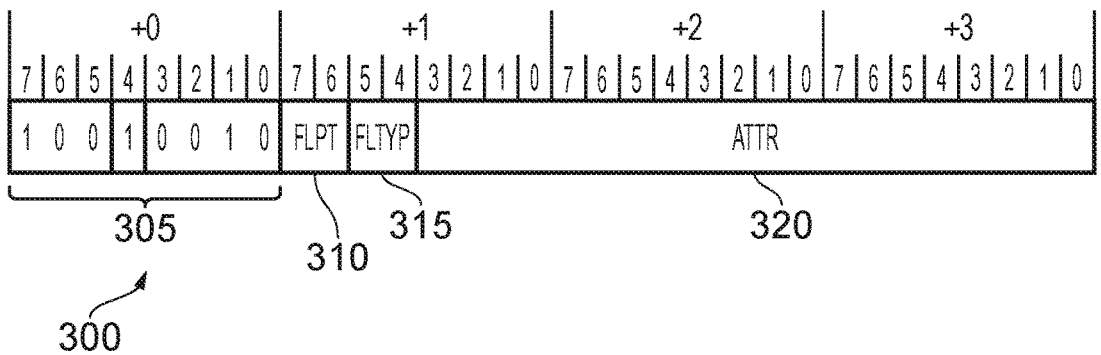
FIG. 5 illustrates one format of packet-based flush command that may be used in an example implementation.
Figure 5:
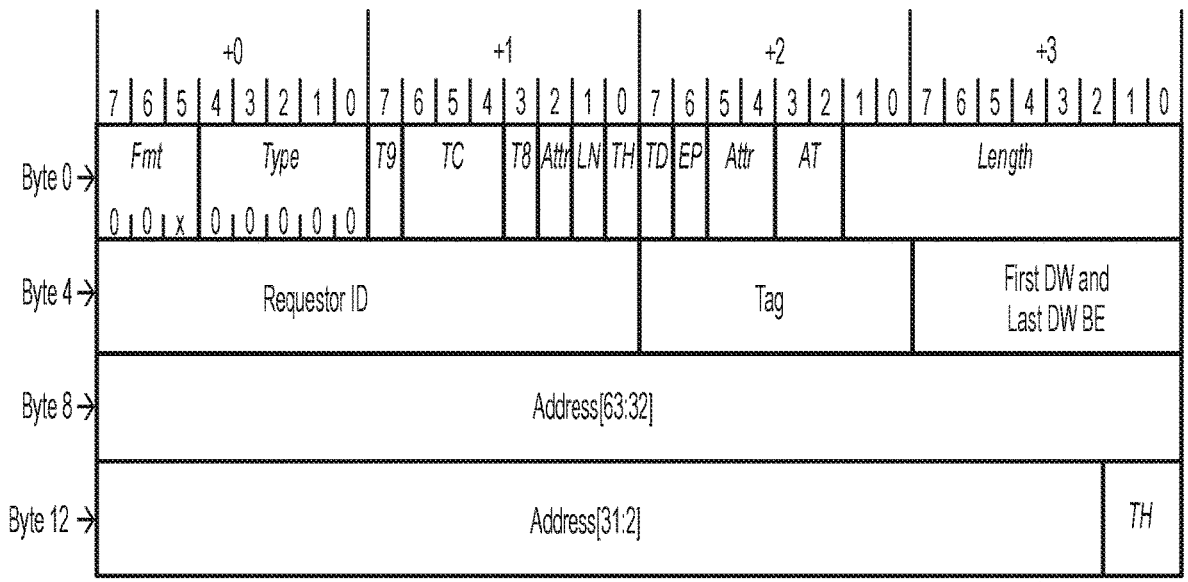

FIG. 5 is a diagram illustrating the format of a packet-based flush command in accordance with a first example implementation, where a flush prefix 300 is used in association with a pre-existing packet format 330. The pre-existing packet format is given a different meaning when it is preceded by a flush prefix 300, and in one example implementation the pre-existing packet format 330 is a read pack format. Hence, in the absence of a preceding flush prefix, the packet 330 will be determined as a read packet identifying a read command. However, when a flush prefix 300 precedes the packet 330, the combination of the flush prefix and the packet will be interpreted as a packet-based flush command.

The flush prefix includes a number of fields as shown in FIG. 5. The field 305 identifies that the prefix is a flush prefix. The flush point field 310 then identifies whether the flush request relates to a shallow flush or a deep flush. The field 315 is a flush type field identifying whether an address-based flush or a flow identifier based flush is to be performed. Finally, the attribute field 320 is used differently dependent on whether the flush type is an address-based flush or a flow identifier based flush. For an address-based flush, the attribute field 320 is used to provide address information that is then employed to determine an address range to which the flush request relates. However, in the event of a flow identifier based flush, the attribute field 320 is used to store a flow identifier value indicating the flow identifier to which the flush request relates.

As mentioned earlier, the packet 330 is in one implementation a read packet (also referred to as a read header packet) and hence the various bit fields within the various bytes have the standard meaning associated with read packets as defined in the PCIe Specification produced by the Peripheral Component Interconnect Special Interest Group (PCI-SIG). Hence, the Fmt and type fields are used to collectively identify the packet as being a read packet. It should be noted that the length field is not used in a read packet format (instead it is identified as a reserved field), since the length field is usually employed to identify the amount of data provided within the packet, and for a read packet there is no accompanying data. However, when the flush prefix is used in association with the read packet in order to perform a flush command, then the length field can optionally be employed to capture additional address information, that can be used in association with address information in the attribute field 320 of the flush prefix to identify the range of addresses for an address-based flush.

As shown in FIG. 5, address information can be provided within the read packet 330 and the amount of address information provided will be dependent on whether 32-bit or 64-bit addresses are used. As also indicated in FIG. 5, bytes 4 through 7 of the packet provide certain byte enable information defined by the PCIe Specification, and also provide a requester ID to identify the requester device that has generated the packet, and a tag field to store a tag value used by that requester device. This requester ID and tag information can then be returned in any response packet from the completer device, to identify the requester device to which that response should be provided. The tag information can then be used by the requester device to match up the response with the command that was previously issued.

Figure 6:
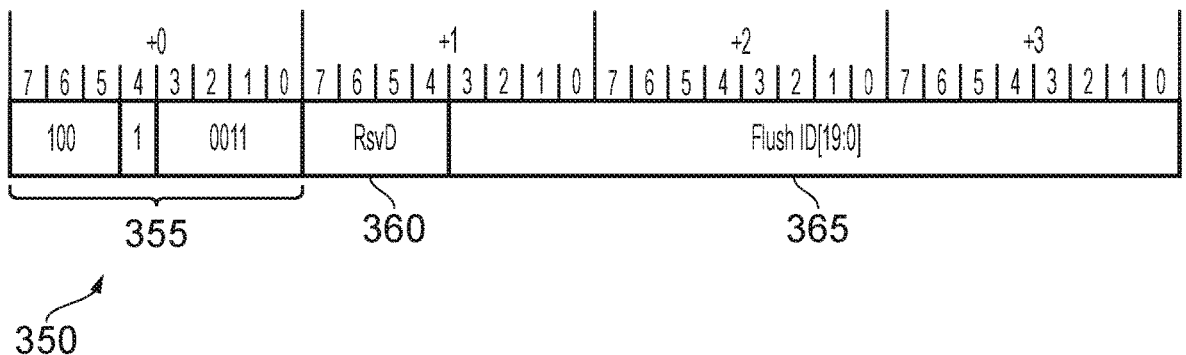
FIG. 6 illustrates how a write command can be arranged to incorporate flow identifier information in accordance with one example arrangement.
Figure 6:
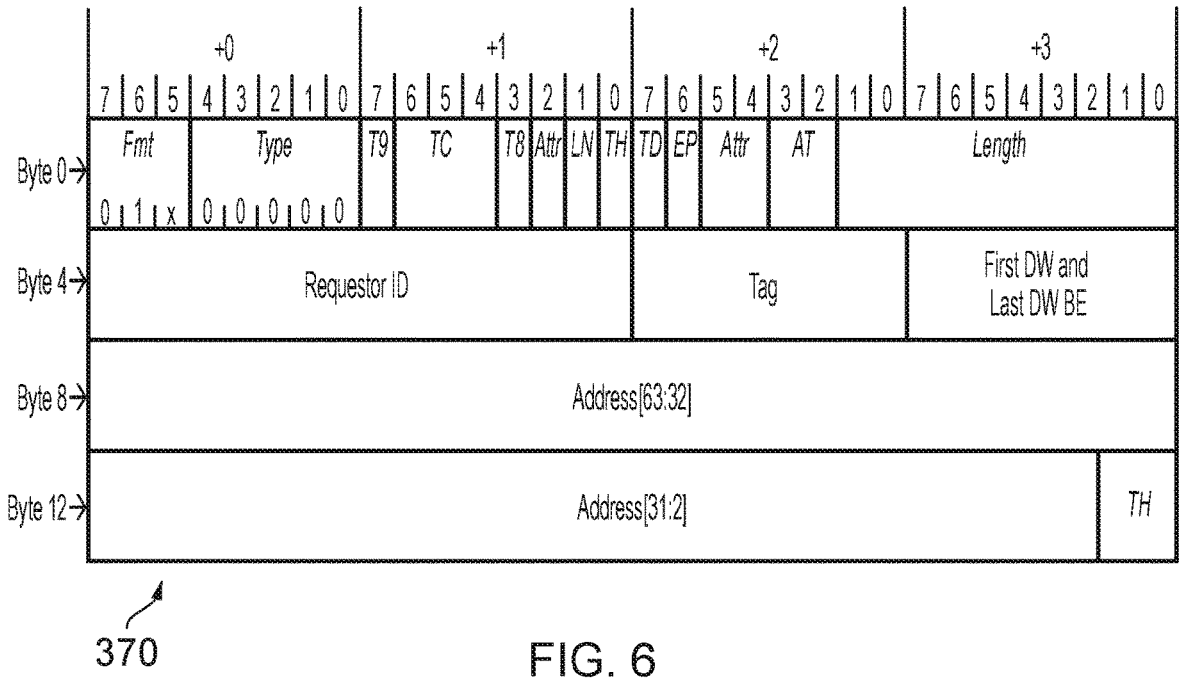

As mentioned earlier, one type of flush command that can be used is a flow identifier based flush command. In order to support the use of a flow identifier flush, then the preceding write commands issued to write data to memory will have flow identifier information associated with them. In one example implementation, this is achieved using a flow identifier prefix, as illustrated in FIG. 6. In particular, a standard write header packet 370 as defined in the PCIe Specification can still be used to transmit the write commands (and the header will typically be followed by a number of bytes of data payload not shown in FIG. 6, the amount of data payload being indicated by the value in the length field), but the write header packet will be preceded by a flow identifier prefix 350. The flow identifier prefix has a first field 355 that identifies that the prefix is a flow identifier prefix. In the example shown in FIG. 6, the upper four bits of byte 1 are then reserved, but the remaining bits of byte 1, and bytes 2 and 3 form a flush identifier field 365 that can store a flush identifier value. At the completer device used to output the write data into the persistence domain for storing at the address indicated in the write packet, the presence of the flow identifier prefix will be identified, and the flow identifier will be extracted from the field 365, so that it can be propagated into the persistence domain with the write data and associated write address. When in due course a flush command is issued specifying a particular flow identifier, then the flow identifier information can be extracted from the flush request by the completer device, and propagated into the persistent domain for use in identifying the write data that is to be subjected to the flush request.

Figure 7:
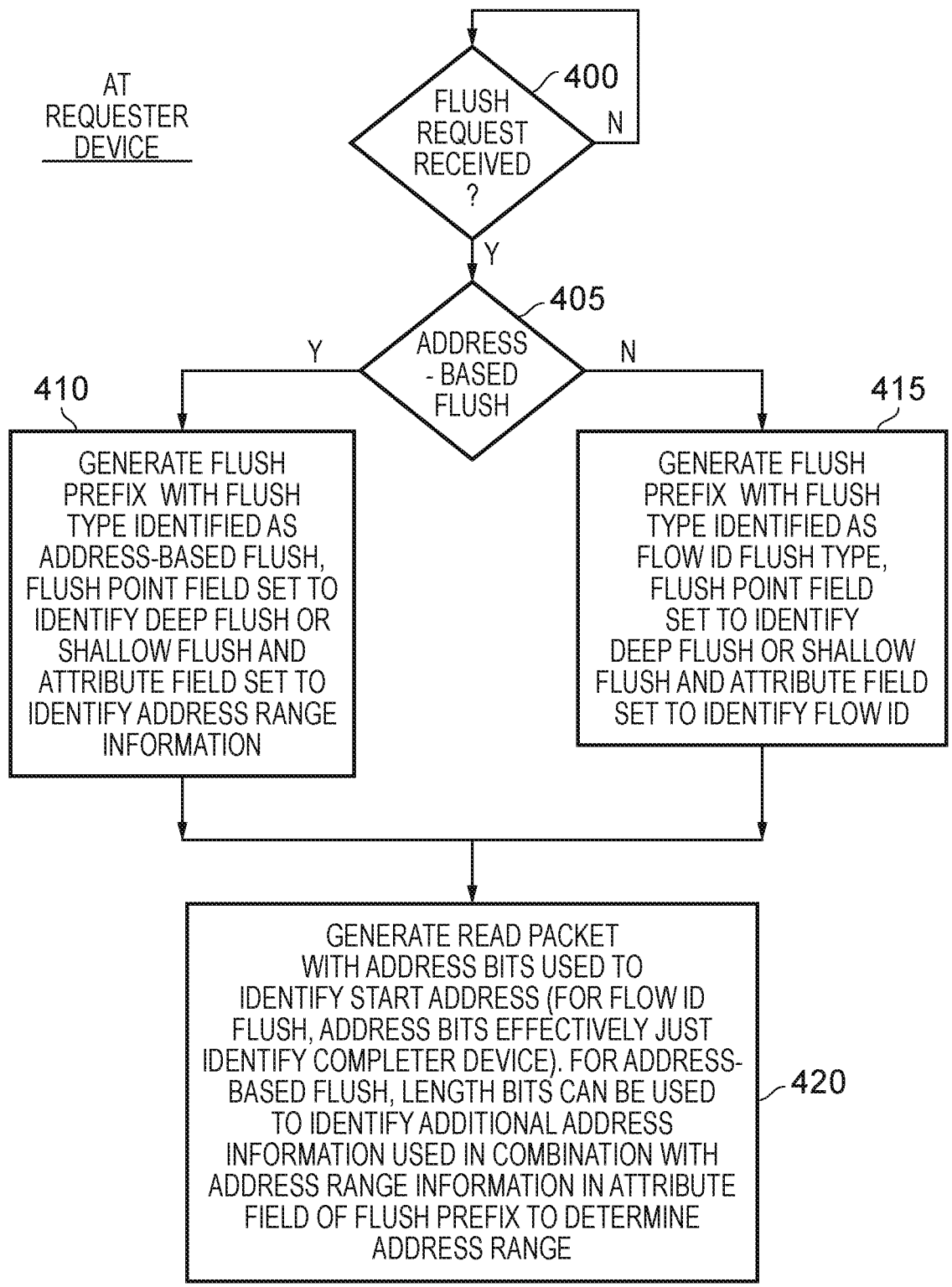
FIG. 7 is a flow diagram illustrating a process performed at a requester device of a packet network in response to receipt of a flush request from a remote agent, in accordance with one example arrangement.

FIG. 7 is a flow diagram illustrating the steps taken at a requester device when processing a flush request received from the remote agent. At step 400, receipt of the flush request is awaited, and upon receipt of the flush request it is determined at step 405 whether an address-based flush request has been issued. If so, the process proceeds to step 410 where a flush prefix is generated as discussed earlier with reference to FIG. 5. The flush type field is set to identify an address-based flush, and the flush point field is set to identify either a deep flush or shallow flush dependent on the information provided in the original flush request. Further, the attribute field is set to identify address range information.

However, if it is determined at step 405 that an address-based flush has not been requested, this means that a flow identifier flush request has been issued, and at step 415 the flush prefix is generated accordingly. Hence, the flush type is set to identify a flow identifier flush type, the flush point field is set as discussed earlier with reference to step 410, and the attribute field is set to identify the flow identifier. The flow identifier may be provided by the flush request received from the remote agent.

Following either step 410 or step 415, the process proceeds to step 420 where a read packet is generated with the address bits used to identify a start address. This start address information is used to identify the completer device to which the read request should be routed. For a flow identifier based flush, that start address information is used solely for that purpose, but for an address-based flush request that information is also used when computing the range to which the address-based flush relates, since additional information provided within the flush prefix (and optionally the length field of the read packet) are used to identify a range of addresses with respect to that start address.

Figure 8:
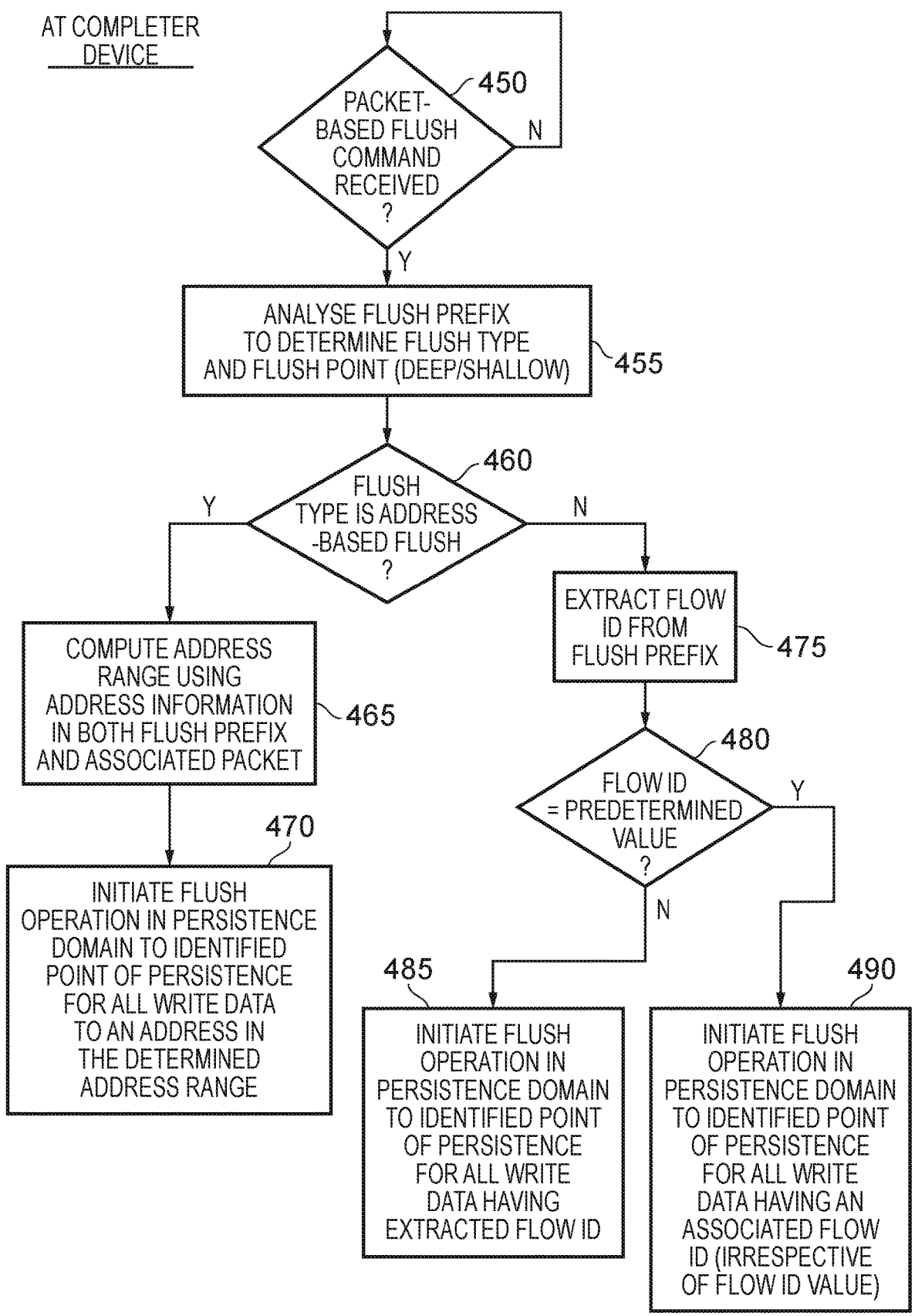
FIG. 8 is a flow diagram illustrating a process performed at a completer device of a packet network in order to process a packet-based flush command, in accordance with one example arrangement.

FIG. 8 is a flow diagram illustrating the steps taken at a completer device upon receipt of a packet-based flush command. Upon detecting such receipt at step 450, then at step 455 the flush prefix is analysed to determine the flush type and the flush point. At step 460, it is then determined whether the flush type is an address-based flush, and if so the process proceeds to step 465 where the address range is computed using the address information in both the flush prefix and the associated packet. More details of the computation performed in one particular implementation will be discussed later with reference to FIG. 9.

Following step 465, then at step 470 a flush operation is initiated in the persistence domain to the identified point of persistence (i.e. to the point of persistence identified by the flush point information in the flush prefix) for all write data to an address in the determined address range. As a result, if in the persistence domain it is determined that there are any items of write data directed to any of those addresses that have not yet reached the identified point of resistance, those data items will be flushed from the relevant intervening storage structures down to the point of persistence.

If at step 460 it is determined that the flush type is instead the flow identifier flush type, then the process proceeds to step 475 where the flow identifier is extracted from the flush prefix. In the example shown in FIG. 8, a predetermined value of flow identifier is reserved as a special flow identifier value, and hence at step 480 it is determined whether the flow identifier has that special predetermined value. Assuming it does not, the process proceeds to step 485 where a flush operation is initiated in the persistence domain to the identified point of persistence for all write data having the extracted flow identifier.

However, if at step 480 it is determined that the flow identifier has the predetermined value, then the process proceeds to step 490 where a flush operation is initiated in the persistence domain to the identified point of persistence for all write data having an associated flow identifier, irrespective of the flow identifier value associated with that write data. Hence, the predetermined value of flow identifier can be used to flush all data items that have flow identifier values associated therewith, and that have not yet reached the point of persistence.

Figure 9:
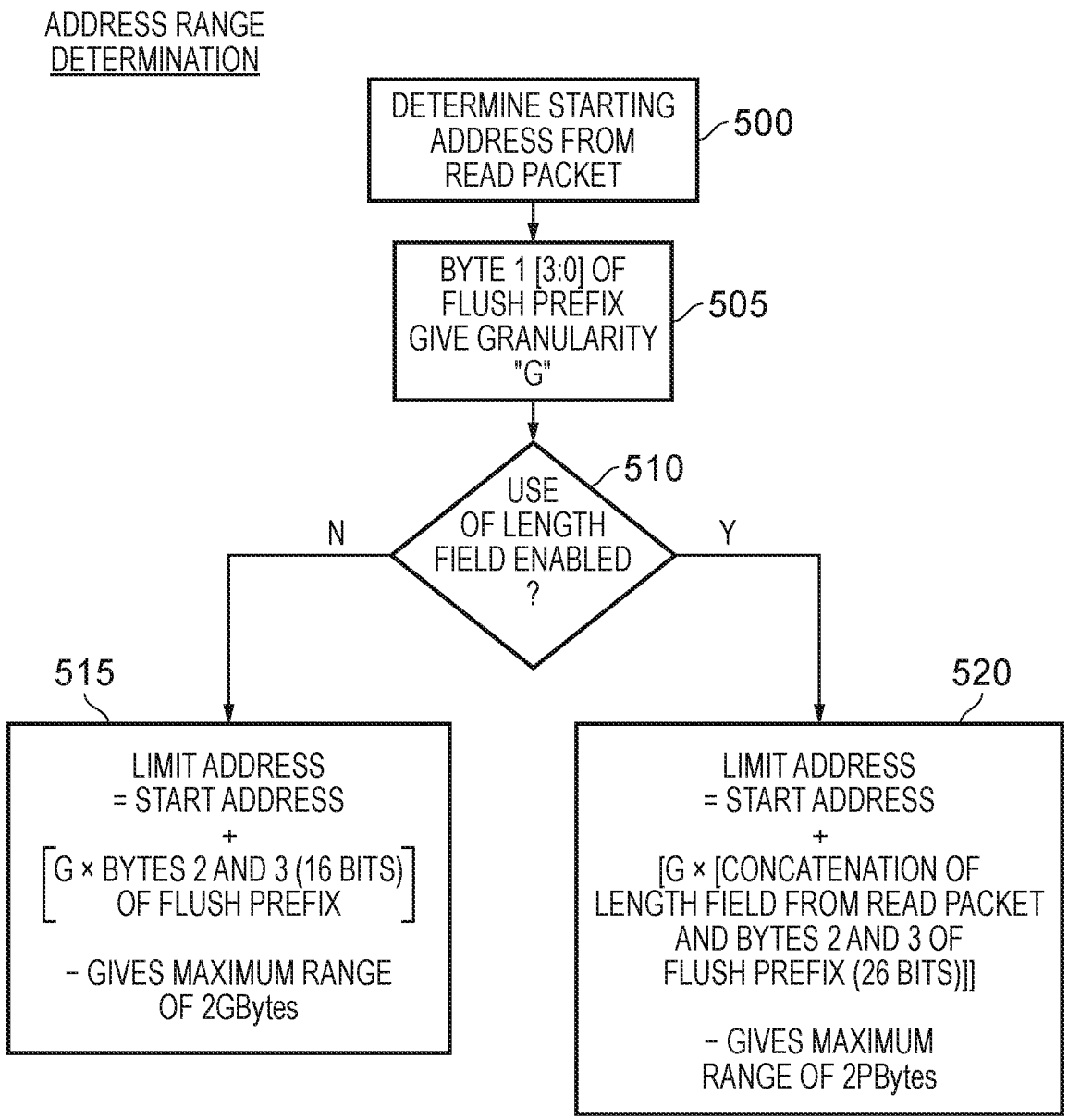
FIG. 9 is a flow diagram illustrating how step 465 of FIG. 8 may be implemented in one example arrangement.

FIG. 9 is a flow diagram illustrating in more detail how the address range can be determined from the information provided within the flush prefix and the associated read packet. At step 500, the starting address is determined from the read packet, this being provided by the information in the address field of the read packet. At step 505, bits 3 to 0 of byte 1 of the flush prefix are used to determine a granularity "G" of the address range limit. This gives the granularity value with which the address range limit field is interpreted. The encoding for this field is in one example implementation as follows:

0000b=Granularity is 1 byte
0001b=Granularity is 2 bytes
0010b=Granularity is 4 bytes
0011b=Granularity is 8 bytes
0100b=Granularity is 16 bytes
0101b=Granularity is 32 bytes
0110b=Granularity is 64 bytes
0111b=Granularity is 128 bytes
1000b=Granularity is 256 bytes
1001b=Granularity is 512 bytes
1010b=Granularity is 1024 bytes
1011b=Granularity is 2048 bytes
1100b=Granularity is 4096 bytes
1101b=Granularity is 8192 bytes
1110b=Granularity is 16384 bytes
1111b=Granularity is 32768 bytes Hence, it will be seen that in this example the granularity can vary from 1 byte to 32 Kbytes.

At step 510, it is determined whether the use of the length field within the read packet to provide addition range information is enabled. If not, the process proceeds to step 515 where the limit address is found by multiplying bytes 2 and 3 of the flush prefix by the Granularity, and then adding that result to the start address. This gives a maximum range of 2 Gigabytes, in a situation where the granularity is set to 32 Kbytes.

If at step 510 it is determined that the length field is enabled, then the process proceeds to step 520. The limit address is computed in essentially the same way as at step 515, but instead of merely using bytes 2 and 3 of the flush prefix, those bytes are concatenated with the additional address information in the length field, giving a value of 26 bits rather than 16 bits, and that concatenated value is then multiplied by the Granularity with the result of that computation being added to the start address. This gives a maximum range of 2 Pbytes when the granularity is set to 32 Kbytes.

Figure 10A:
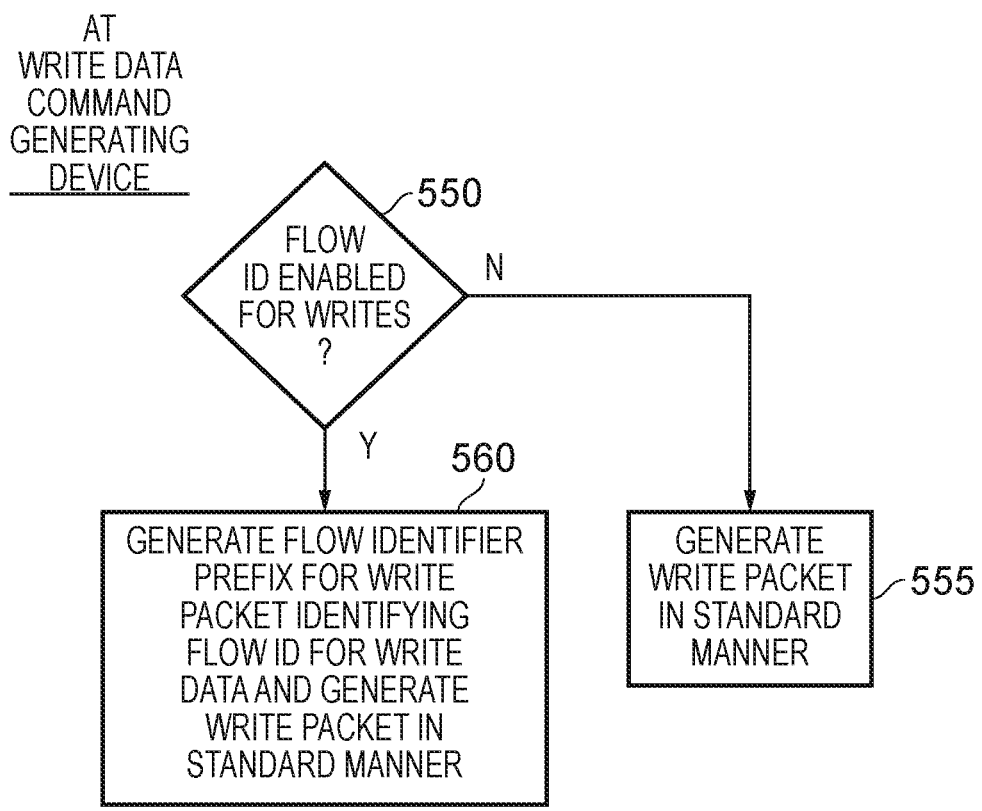
FIGS. 10A and 10B are flow diagrams illustrating how write data commands incorporating flow identifier information may be generated and subsequently processed within a packet network, in accordance with one example arrangement.

FIG. 10A illustrates how write data commands are generated at a generating device. When a write request is received by a command generating device within the PCIe network, it is determined at step 550 whether a flow identifier is enabled for writes. If not, then at step 555 the write packet is generated in the standard manner. However, if flow identifier is enabled then at step 560 a flow identifier prefix is generated of the form discussed earlier with reference to FIG. 6, and output in association with a write packet in order to identify the write data command. As discussed earlier, the write data packet can be of the standard form, and the flow identifier prefix will provide the flow identifier value that is associated with the write data.

Figure 10B:
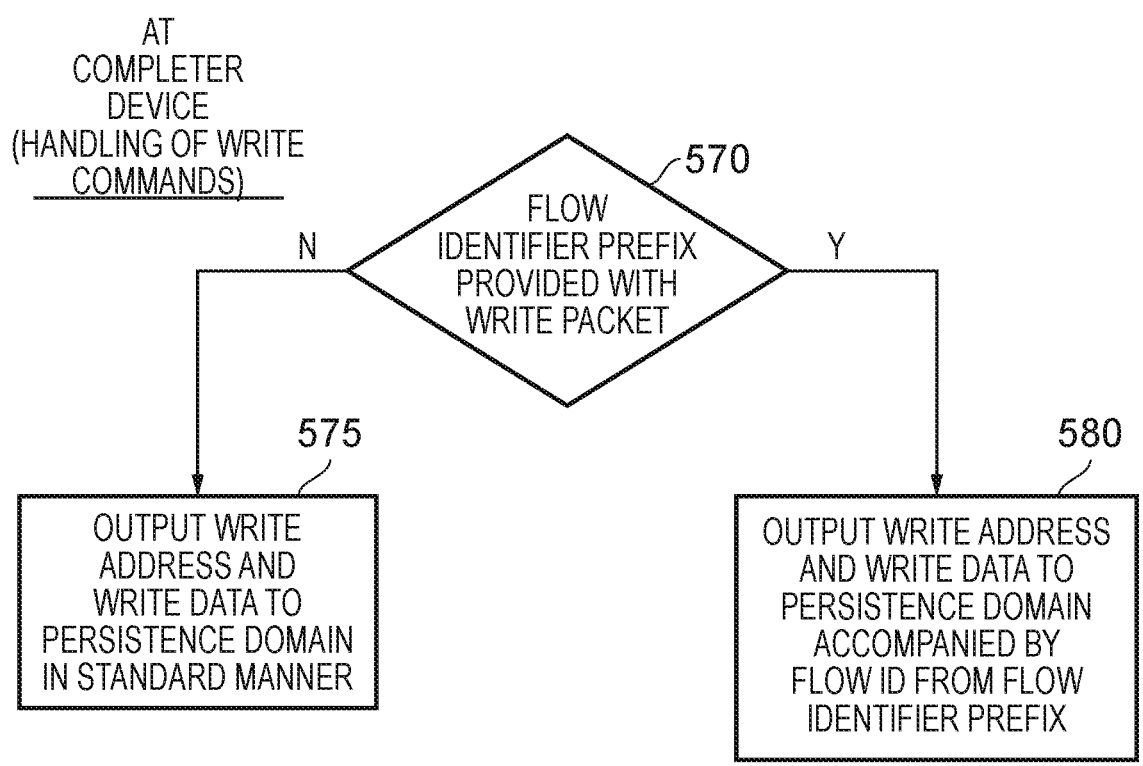

FIG. 10B is a flow diagram illustrating how a write data command is analysed at a completer device. At step 570, it is determined whether a flow identifier prefix is provided with the write packet. If not, then at step 575 the write address and write data are extracted from the write packet and output to the persistence domain in the standard manner. However, if a flow identifier prefix is provided with the write packet, then the process proceeds to step 580 where the write address and write data are output to the persistence domain, but in this instance are accompanied by the flow identifier that it has extracted from the flow identifier prefix.

In one example implementation, the packet-based flush command is a command for which a response is to be provided in due course once the flush operation has been performed. For this purpose, a standard format of completion packet can be used, and in particular a completion packet format having no data, since no data needs to be returned in response to the flush command (in contrast say to a read command in which read data needs to be provided in the response), and all that is required is a response providing the status of the flush operation, i.e. whether it completed successfully or not.

Figure 11A:
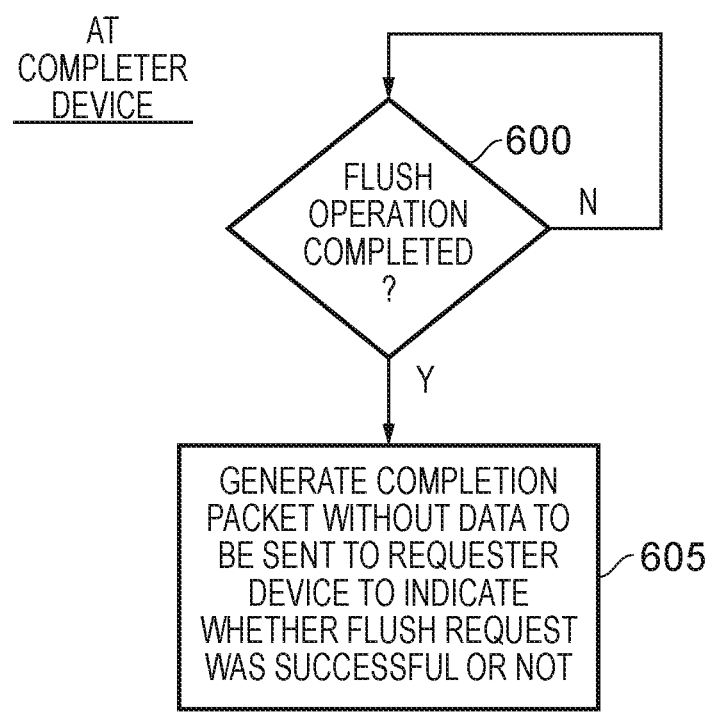
FIG. 11A is a flow diagram illustrating how a completer device within a packet network may generate a completion packet upon completion of a flush operation, in accordance with one example arrangement.

FIG. 11A is a flow diagram illustrating steps taken at the completer device in order to issue such a completion packet. At step 600, completion of the flush operation is awaited, and then at step 605 a completion packet is generated without data to be sent to the requester device to indicate whether the flush request was successful or not.

Figure 11B:
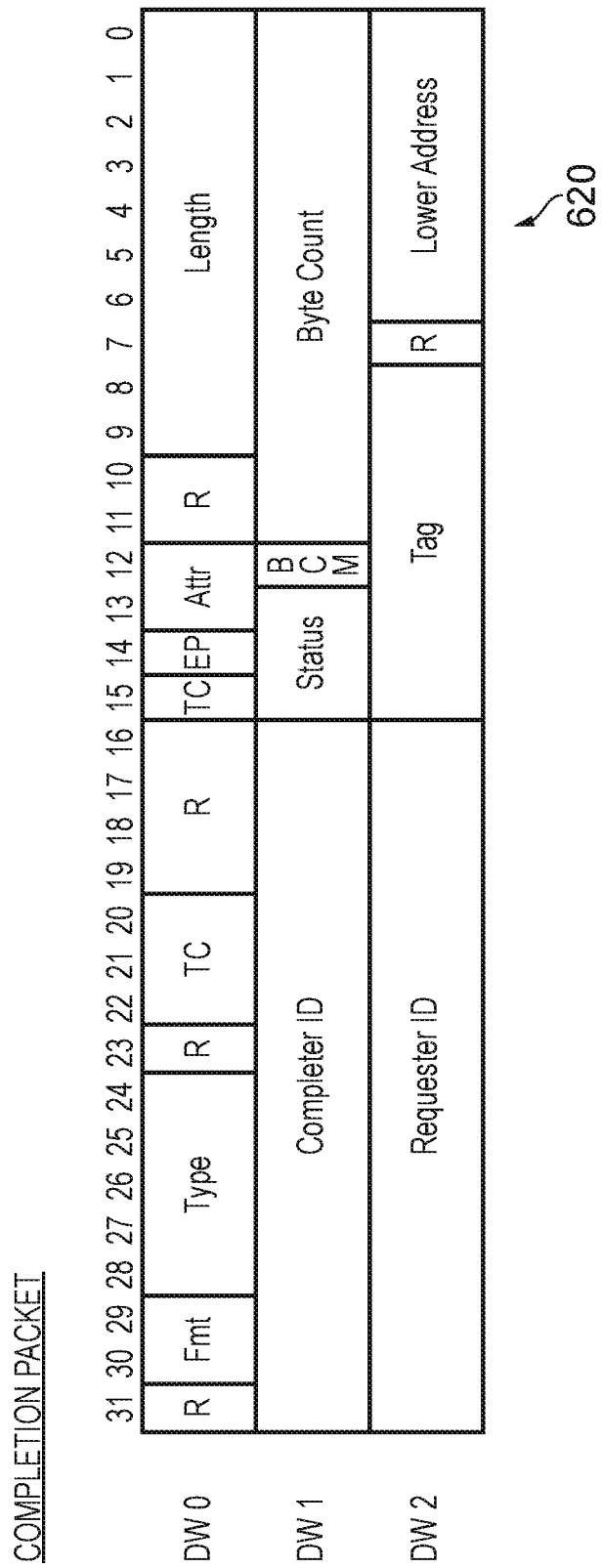
FIG. 11B is a diagram illustrating the format of a completion packet in one example arrangement.

FIG. 11B illustrates an example of completion packet that can be used. The Fmt field in combination with the type field identify that the completion packet is a completion packet without data. Accordingly, the length field will be set to all zeros, as there will be no data provided with the packet, and the length field can hence be viewed as a reserved field in this type of completion packet. A completer ID field is used to identify the completer device that is issuing the completion packet. As also shown, a status field is used to identify whether the flush operation completed correctly or not. Also provided is a requester ID field to identify the requester device to which the completion packet is directed, and as discussed earlier the tag field can be used to provide a tag value that will be used by that requester device in due course, upon receipt of the completion packet, to tie the completion packet up with a corresponding command that it previously issued.

In the above described example implementation, the packet-based flush command is represented through use of an existing packet type preceded by a flush prefix. However, in an alternative implementation dedicated packet types may be provided for the flush commands, as a result of which no flush prefix will be needed. Two example formats are shown in FIGS. 12A and 12B. In particular, the first dedicated packet type 650 can be used for performing an address-based flush command. The Fmt and type fields can be used to identify that the packet relates to a flush command. As can be seen, this packet incorporates all of the information fields discussed earlier with reference to the flush prefix based implementation, and hence gives address information sufficient to identify a start address and the address range limit. Also, the flush point and flush type fields are provided to identify whether a deep or shallow flush is required, and in this case the flush type field will identify that an address-based flush is to be performed. The start address is given by the flush address fields, and will either be a 64 bit value or a 32 bit value dependent on the addressing mode. It should be noted that the start address bits 1 and 0 are given by bits 1 and 0 in byte 20 in this particular format of flush command. The ending address is then the start address plus the address range limit information. Address range limit bits 47 to 0 are used when performing 64 bit addressing, whereas for 32 bit addressing the address range limit bits 31 to 0 are used.

FIG. 12B illustrates a second dedicated packet type 670 that can be used when employing a flow ID based flush. The start address is computed in the same way as discussed above with reference to FIG. 12A. Again, the flush point field can identify whether a deep flush or a shallow flush is to be performed, and the flush type field identifiers in this case, that a flow ID based flush is to be performed. As shown in FIG. 12B, a flow identifier field enables a 20 bit flow identifier value to be provided. As discussed earlier when discussing flow identifier based flush commands, the flush address is used solely to route the command to the appropriate completer device and is not used by the completer in performing the flush processing, since in this latter case it is the flow identifier that is used to identify the data items that need to be flushed to the point of persistence.

It will be noted that the dedicated packet types shown in FIGS. 12A and 12B are of a larger size than the packets discussed previously. The length field can be used to encode the total size of the packet, identifying a number of additional data words of payload used beyond the normal number of data words applicable for either 64 bit or 32 bit addressing.

If the completer device does not support these new types of request command, then it will be arranged to send an unsupported request response back to the requester device.

When employing the above described techniques within a PCIe network, then it is envisaged that flush requests can be generated by either an endpoint or a root port. Writes with flow ID prefix can also be generated by endpoints or a root port. PCIe Functions (these being the smallest entities discoverable by software, and hence for example an endpoint can have multiple functions with different IDs therein) with Memory Space BARs and root ports can be completers for flush requests and for writes with flow ID prefix.

By adopting the above described techniques, it has been found that the handling of flush requests from remote agents can be performed significantly faster than using known techniques, thereby reducing the risk that data is not written to a point of persistence prior to an interruption in power.

Other example arrangements are set out in the following clauses:

1. An apparatus comprising:
   a requester device within a packet network to receive a flush request generated by a remote agent requesting that one or more data items be flushed to a point of persistence, and to translate the flush request into a packet-based flush command conforming to a packet protocol of the packet network; and
   a completer device within the packet network that is coupled to a persistence domain incorporating the point of persistence, the completer device being arranged to detect receipt of the packet-based flush command and to trigger a flush operation within the persistence domain to flush said one or more data items to the point of persistence.

2. An apparatus as in Clause 1, wherein the packet-based flush command forms a native command of the packet network that is distinguished by devices of the packet network from other native commands routed through the packet network.

3. An apparatus as in Clause 1 or Clause 2, wherein the packet protocol is the Peripheral Component Interconnect Express (PCIe) protocol and the packet-based flush command forms a transaction layer command.

4. An apparatus as in any preceding clause, wherein the packet-based flush command is arranged to identify a flush type.

5. An apparatus as in Clause 4, wherein the flush type is used to distinguish between an address-based flush type where the one or more data items to be flushed are identified by an address range determined by the completer device from address information provided with the packet-based flush command, and an alternative flush type.

6. An apparatus as in Clause 5, wherein the alternative flush type is a flow identifier flush type where a flow identifier is provided within the packet-based flush command, and the one or more data items to be flushed are those data items within the persistence domain that have not yet reached the point of persistence and which have the flow identifier associated therewith.

7. An apparatus as in Clause 6, wherein one or more devices within the packet network are arranged to generate write data commands for transfer over the packet network to the completer device, and in order to support the flow identifier flush type are arranged to generate a write data command formed by a flow identifier prefix and at least one associated write data packet, with the flow identifier prefix containing an indication of a flow identifier associated with each item of write data contained in the at least one associated write data packet.

8. An apparatus as in Clause 6 or Clause 7, wherein when the flow identifier provided within the packet-based flush command has a predetermined value, the completer device is arranged to interpret the packet-based flush command as relating to all data items within the persistence domain that have not yet reached the point of persistence and which have any value of flow identifier associated therewith.

9. An apparatus as in Clause 7, or Clause 8 when dependent on Clause 7, wherein the flow identifier prefix is an end-to-end prefix that is routed with the associated write data packet through the packet network to the completer device via any intervening devices of the packet network.

10. An apparatus as in any preceding clause, wherein the packet-based flush command is arranged to provide a flush point indication used to identify a point of persistence level to which the one or more data items are to be flushed.

11. An apparatus as in Clause 10, wherein the flush point is used to distinguish between a shallow flush to a first point of persistence and a deep flush to a second point of persistence more resilient to hardware failure than the first point of persistence.

12. An apparatus as in any preceding clause, wherein the requester device comprises translation circuitry to translate the flush request into the packet-based flush command such that the packet-based flush command comprises at least a packet for transmission through the packet network to the completer device.

13. An apparatus as in Clause 12, wherein the translation circuitry is arranged to generate a flush prefix and at least one associated packet to form the packet-based flush command, wherein the associated packet is of a type also used for another form of command within the packet network, and the flush prefix is used to cause the completer device to interpret the flush prefix and the associated packet as collectively forming the packet-based flush command.

14. An apparatus as in Clause 13, wherein the associated packet is of a type also used for a read command within the packet network.

15. An apparatus as in Clause 13 or Clause 14, wherein the flush prefix is an end-to-end prefix that is routed with the associated packet through the packet network from the requester device to the completer device via any intervening devices of the packet network.

16. An apparatus as in any of clauses 13 to 15, wherein the flush prefix comprises a type field to identify a flush type used to distinguish between an address-based flush type where the one or more data items to be flushed are identified by an address range determined by the completer device from address information provided with the packet-based flush command, and an alternative flush type.

17. An apparatus as in any of clauses 13 to 16, wherein the flush prefix comprises an attribute field, and the completer device is arranged, when performing an address-based flush in response to the packet-based flush command, to use address information provided in the attribute field of the flush prefix, in combination with further address information provided in the associated packet, to determine an address range used to identify the data items to be flushed.

18. An apparatus as in Clause 17, wherein the further address information provided in the associated packet comprises at least an indication of a start address, and the address information from the attribute field of the flush prefix is used to identify a range of addresses starting from the start address.

19. An apparatus as in Clause 18, wherein the further address information provided in the associated packet includes a length field providing a value which is used in combination with the address information from the attribute field of the flush prefix to determine the range of addresses.

20. An apparatus as in any of clauses 13 to 19, wherein the flush prefix comprises a flush point field used to identify a point of persistence level to which the one or more data items are to be flushed.

21. An apparatus as in Clause 12, wherein the translation circuitry is arranged to employ at least one dedicated packet type to form the packet-based flush command.

22. An apparatus as in Clause 21, wherein a first dedicated packet type is used to identify a packet-based flush command of an address-based flush type, and a second dedicated packet type is used to identify a packet-based flush command of a flow identifier flush type.

23. An apparatus as in Clause 22, wherein the first dedicated packet type comprises address information sufficient to determine a range of addresses identifying the one or more data items to be flushed.

24. An apparatus as in Clause 22 or Clause 23, wherein the second dedicated packet type comprises a flow identifier field to provide a flow identifier, and the one or more data items to be flushed are those data items within the persistence domain that have not yet reached the point of persistence and which have the flow identifier associated therewith.

25. An apparatus as in any of clauses 21 to 24, wherein the at least one dedicated packet type comprises a flush point field used to identify a point of persistence level to which the one or more data items are to be flushed.

26. An apparatus as in any preceding clause, wherein the completer device is arranged, on detecting completion of the flush operation within the persistence domain, to send a completion acknowledgement packet through the packet network to the requester device.

27. An apparatus as in any preceding clause, wherein each of the requester device and the completer device are provided with one or more configuration registers in which configuration information is stored to identify whether those devices are enabled to handle the packet-based flush command.

28. A requester device for use in a packet network to receive a flush request generated by a remote agent requesting that one or more data items be flushed to a point of persistence, the requester device comprising translation circuity to translate the flush request into a packet-based flush command conforming to a packet protocol of the packet network, for onward transmission through the packet network to a completer device used to trigger a flush operation within a persistence domain incorporating the point of persistence.

29. A completer device for use within a packet network, the completer device have flush operation trigger circuitry, responsive to receipt by the completer device of a packet-based flush command conforming to a packet protocol of the packet network, to trigger a flush operation within a persistence domain in order to flush one or more data items identified by the packet-based flush command to a point of persistence within the persistence domain.

30. A method of operating a packet network to process flush requests, comprising:

receiving at a requester device within the packet network a flush request generated by a remote agent requesting that one or more data items be flushed to a point of persistence;

translating, at the requester device, the flush request into a packet-based flush command conforming to a packet protocol of the packet network;

transporting the packet-based flush command through the packet network to a completer device that is coupled to a persistence domain incorporating the point of persistence; and arranging the completer device, responsive to detecting receipt of the packet-based flush command, to trigger a flush operation within the persistence domain to flush said one or more data items to the point of persistence.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a requester device within a packet network to receive a flush request generated by a remote agent requesting that one or more data items be flushed to a point of persistence, and to translate the flush request into a packet-based flush command conforming to a packet protocol of the packet network; and
a completer device within the packet network that is coupled to a persistence domain incorporating the point of persistence, the completer device being arranged to detect receipt of the packet-based flush command and to trigger a flush operation within the persistence domain to flush said one or more data items to the point of persistence;
wherein the packet-based flush command is arranged to identify a flush type, and the flush type is used to distinguish between
an address-based flush type where the one or more data items to be flushed are identified by an address range determined by the completer device from address information provided with the packet-based flush command, and
a flow identifier flush type where a flow identifier is provided within the packet-based flush command, and the one or more data items to be flushed are those data items within the persistence domain that have not yet reached the point of persistence and which have the flow identifier associated therewith.

2. An apparatus as claimed in claim 1, wherein the packet-based flush command forms a native command of the packet network that is distinguished by devices of the packet network from other native commands routed through the packet network.

3. An apparatus as claimed in claim 1, wherein the packet protocol is the Peripheral Component Interconnect Express (PCIe) protocol and the packet-based flush command forms a transaction layer command.

4. An apparatus as claimed in claim 1, wherein one or more devices within the packet network are arranged to generate write data commands for transfer over the packet network to the completer device, and in order to support the flow identifier flush type are arranged to generate a write data command formed by a flow identifier prefix and at least one associated write data packet, with the flow identifier prefix containing an indication of a flow identifier associated with each item of write data contained in the at least one associated write data packet.

5. An apparatus as claimed in claim 4, wherein the flow identifier prefix is an end-to-end prefix that is routed with the associated write data packet through the packet network to the completer device via any intervening devices of the packet network.

6. An apparatus as claimed in claim 1, wherein when the flow identifier provided within the packet-based flush command has a predetermined value, the completer device is arranged to interpret the packet-based flush command as relating to all data items within the persistence domain that have not yet reached the point of persistence and which have any value of flow identifier associated therewith.

7. An apparatus as claimed in claim 1, wherein the packet-based flush command is arranged to provide a flush point indication used to identify a point of persistence level to which the one or more data items are to be flushed.

8. An apparatus as claimed in claim 7, wherein the flush point is used to distinguish between a shallow flush to a first point of persistence and a deep flush to a second point of persistence more resilient to hardware failure than the first point of persistence.

9. An apparatus as claimed in claim 1, wherein the requester device comprises translation circuitry to translate the flush request into the packet-based flush command such that the packet-based flush command comprises at least a packet for transmission through the packet network to the completer device.

10. An apparatus as claimed in claim 9, wherein the translation circuitry is arranged to generate a flush prefix and at least one associated packet to form the packet-based flush command, wherein the associated packet is of a type also used for another form of command within the packet network, and the flush prefix is used to cause the completer device to interpret the flush prefix and the associated packet as collectively forming the packet-based flush command.

11. An apparatus as claimed in claim 10, wherein the associated packet is of a type also used for a read command within the packet network.

12. An apparatus as claimed in claim 10, wherein the flush prefix is an end-to-end prefix that is routed with the associated packet through the packet network from the requester device to the completer device via any intervening devices of the packet network.

13. An apparatus as claimed in claim 10, wherein the flush prefix comprises a type field to identify a flush type used to distinguish between an address-based flush type where the one or more data items to be flushed are identified by an address range determined by the completer device from address information provided with the packet-based flush command, and an alternative flush type.

14. An apparatus as claimed in claim 10, wherein the flush prefix comprises an attribute field, and the completer device is arranged, when performing an address-based flush in response to the packet-based flush command, to use address information provided in the attribute field of the flush prefix, in combination with further address information provided in the associated packet, to determine an address range used to identify the data items to be flushed.

15. An apparatus as claimed in claim 14, wherein the further address information provided in the associated packet comprises at least an indication of a start address, and the address information from the attribute field of the flush prefix is used to identify a range of addresses starting from the start address.

16. An apparatus as claimed in claim 15, wherein the further address information provided in the associated packet includes a length field providing a value which is used in combination with the address information from the attribute field of the flush prefix to determine the range of addresses.

17. An apparatus as claimed in claim 10, wherein the flush prefix comprises a flush point field used to identify a point of persistence level to which the one or more data items are to be flushed.

18. An apparatus as claimed in claim 9, wherein the translation circuitry is arranged to employ at least one dedicated packet type to form the packet-based flush command.

19. An apparatus as claimed in claim 18, wherein a first dedicated packet type is used to identify a packet-based flush command of an address-based flush type, and a second dedicated packet type is used to identify a packet-based flush command of a flow identifier flush type.

20. An apparatus as claimed in claim 19, wherein the first dedicated packet type comprises address information sufficient to determine a range of addresses identifying the one or more data items to be flushed.

21. An apparatus as claimed in claim 19, wherein the second dedicated packet type comprises a flow identifier field to provide a flow identifier, and the one or more data items to be flushed are those data items within the persistence domain that have not yet reached the point of persistence and which have the flow identifier associated therewith.

22. An apparatus as claimed in claim 18, wherein the at least one dedicated packet type comprises a flush point field used to identify a point of persistence level to which the one or more data items are to be flushed.

23. An apparatus as claimed in claim 1, wherein the completer device is arranged, on detecting completion of the flush operation within the persistence domain, to send a completion acknowledgement packet through the packet network to the requester device.

24. An apparatus as claimed in claim 1, wherein each of the requester device and the completer device are provided with one or more configuration registers in which configuration information is stored to identify whether those devices are enabled to handle the packet-based flush command.

25. A requester device for use in a packet network to receive a flush request generated by a remote agent requesting that one or more data items be flushed to a point of persistence, the requester device comprising translation circuitry to translate the flush request into a packet-based flush command conforming to a packet protocol of the packet network, for onward transmission through the packet network to a completer device used to trigger a flush operation within a persistence domain incorporating the point of persistence:
wherein the packet-based flush command is arranged to identify a flush type and the flush type is used to distinguish between
an address-based flush type where the one or more data items to be flushed are identified by an address range determined by the completer device from address information provided with the packet-based flush command, and
a flow identifier flush type where a flow identifier is provided within the packet-based flush command, and the one or more data items to be flushed are those data items within the persistence domain that have not yet reached the point of persistence and which have the flow identifier associated therewith.

26. A completer device for use within a packet network, the completer device having flush operation trigger circuitry, responsive to receipt by the completer device of a packet-based flush command conforming to a packet protocol of the packet network, to trigger a flush operation within a persistence domain in order to flush one or more data items identified by the packet-based flush command to a point of persistence within the persistence domain:
- wherein the packet-based flush command is arranged to identify a flush type and the flush type is used to distinguish between
  - an address-based flush type where the one or more data items to be flushed are identified by an address range determined by the completer device from address information provided with the packet-based flush command, and
  - a flow identifier flush type where a flow identifier is provided within the packet-based flush command, and the one or more data items to be flushed are those data items within the persistence domain that have not yet reached the point of persistence and which have the flow identifier associated therewith.

27. A method of operating a packet network to process flush requests, comprising:
- receiving at a requester device within the packet network a flush request generated by a remote agent requesting that one or more data items be flushed to a point of persistence;
- translating, at the requester device, the flush request into a packet-based flush command conforming to a packet protocol of the packet network;
- transporting the packet-based flush command through the packet network to a completer device that is coupled to a persistence domain incorporating the point of persistence; and
- arranging the completer device, responsive to detecting receipt of the packet-based flush command, to trigger a flush operation within the persistence domain to flush said one or more data items to the point of persistence;
- wherein the packet-based flush command is arranged to identify a flush type and the flush type is used to distinguish between
  - an address-based flush type where the one or more data items to be flushed are identified by an address range determined by the completer device from address information provided with the packet-based flush command, and
  - a flow identifier flush type where a flow identifier is provided within the packet-based flush command, and the one or more data items to be flushed are those data items within the persistence domain that have not yet reached the point of persistence and which have the flow identifier associated therewith.

* * * * *